(12) United States Patent
Takahashi

(10) Patent No.: US 7,627,689 B2
(45) Date of Patent: Dec. 1, 2009

(54) INFORMATION PROCESSING SYSTEM, APPARATUS, METHOD AND COMPUTER PROGRAM PRODUCT HAVING NETWORK-SPECIFIC ADDRESS FEATURES AND GLOBAL ADDRESS FEATURES

(75) Inventor: Masayuki Takahashi, Tokyo (JP)

(73) Assignee: Sony Corporation, Tokyo (JP)

( * ) Notice: Subject to any disclaimer, the term of this patent is extended or adjusted under 35 U.S.C. 154(b) by 1239 days.

(21) Appl. No.: 10/692,797

(22) Filed: Oct. 27, 2003

(65) Prior Publication Data

US 2004/0139225 A1 Jul. 15, 2004

(30) Foreign Application Priority Data

Nov. 1, 2002 (JP) .............................. 2002-319799
Sep. 29, 2003 (JP) .............................. 2003-337346

(51) Int. Cl.
G06F 15/16 (2006.01)
(52) U.S. Cl. ..................... 709/238; 709/224; 709/227
(58) Field of Classification Search ................. 709/238, 709/217, 245, 200–203, 218–227
See application file for complete search history.

(56) References Cited

U.S. PATENT DOCUMENTS

| | | | | |
|---|---|---|---|---|
| 5,915,119 | A * | 6/1999 | Cone | 713/310 |
| 6,292,838 | B1 * | 9/2001 | Nelson | 709/236 |
| 6,324,161 | B1 * | 11/2001 | Kirch | 370/217 |
| 6,393,488 | B1 * | 5/2002 | Araujo | 709/245 |
| 6,445,922 | B1 * | 9/2002 | Hiller et al. | 455/433 |
| 6,510,154 | B1 * | 1/2003 | Mayes et al. | 370/389 |
| 6,993,012 | B2 * | 1/2006 | Liu et al. | 370/352 |
| 2002/0138552 | A1 * | 9/2002 | DeBruine et al. | 709/203 |

FOREIGN PATENT DOCUMENTS

| | | |
|---|---|---|
| JP | 2003-258836 | 9/2003 |
| JP | 2005-525750 | 8/2005 |

* cited by examiner

Primary Examiner—Moustafa M Meky
(74) Attorney, Agent, or Firm—Oblon, Spivak, McClelland, Maier & Neustadt, L.L.P.

(57) ABSTRACT

In an information processing system in which communication is performed using a IM server, a client connected to a NAT apparatus is capable of easily performing direct communicate with one of the other clients, regardless of whether or not the one of the other clients is connected with the same NAT apparatus as that with which the client is connected. Clients are registered beforehand in the IM server. When a first client wants to communicate with a second client, the first client requests, via the NAT apparatus, the IM server to determine whether the registered address of the first client is identical to the registered address of the second client. The IM server determines whether the addresses are identical to each other and the IM server informs the first client of the result of the determination. If it is determined that the addresses are not identical to each other, the first client performs communication with the second client on a global address basis. On the other hand, when it is determined that the addresses are identical to each other, the first client performs communication with the second client on a local address basis.

25 Claims, 18 Drawing Sheets

INFORMATION PROCESSING SYSTEM, APPARATUS, METHOD AND COMPUTER PROGRAM PRODUCT HAVING NETWORK-SPECIFIC ADDRESS FEATURES AND GLOBAL ADDRESS FEATURES

BACKGROUND OF THE INVENTION

1. Field of the Invention

The present invention relates to an information processing system, an information processing apparatus, an information processing method, and an information processing program, and more particularly, to an information processing system, an information processing apparatus, an information processing method, and an information processing program, which make it possible for an apparatus to communicate with another apparatus using a IM server even when apparatuses are connected with the Internet via a NAT apparatus.

2. Description of the Related Art

FIG. 1 shows an example of a conventional information processing system. In this information processing system, a client 11 and a client 12 are connected with the Internet 1, with which a server 13 is also connected. In general, the client 11 and the client 12 have information indicating an IP address of the server 13, defined as a global address on the Internet 1, and thus the client 11 and the client 12 can communicate with the server 13. This allows the client 11 and the client 12 to receive various kinds of information from the server 13.

However, the client 11 and the client 12, which are used by general users, do not have information about the global address (IP address), defined on the Internet 1, of the other client, and thus either client cannot directly communicate with the other client via the Internet 1. For example, the client 12 cannot directly communication with the client 11 via the Internet 1.

To solve the above problem, it is known to use an IM (instant messaging) server, such as an IM server 21 shown in FIG. 2. The client 11 and the client 12 are registered beforehand in a buddy list stored in the IM server 21. Each time one of registered clients logs on the IM server 21 via the Internet 1, the IM server 21 informs the other clients registered in the buddy list that the client has logged on. Thus, any client logging on the IM server 21 can know which clients are currently logging on the IM server 21.

For example, when the client 11 and the client 12 log in the IM server 21, the registered address (the global address (IP address) defined on the Internet 1) of the client 12 is transmitted to the client 11 via the IM server 21, and the registered global address (IP address) of the client 11 is transmitted to the client 12 via the IM server 21. Thus, both the client 11 and the client 12 get the global addresses in the form of the IP addresses of the other clients via the IM server 21. This makes it possible to each client to establish a session to perform peer-to-peer communication via the Internet 1 without passing through the IM server 21.

The global address in the form of the IP address of each user (client) is personal information that should be kept secret from general users other than specific users. In the case in which communication is performed via the IM server 21, the global address (the IP address) of each user is provided only to limited other users permitted to register the global address in the buddy list, and thus privacy can be maintained. Because of the above-described advantage, IM servers are becoming increasingly popular. A further detailed description of instant messaging may be found in journals or books (for example, in "INSTANT MESSAGING: COMPREHENSIVE INTRODUCTION", Yoji Kanda, published Jan. 25, 2002 by Ohmsha, pp. 5 to 18).

In a case in which, as shown in FIG. 3, clients are connected with the Internet 1 via a NAT (Network Address Translation) apparatus, not only global addresses but also local addresses are necessary in two-way clients.

For example, in the system shown in FIG. 3, clients 11, 51, and 52 are connected with each other via a LAN (Local Area Network) 31. Those clients 11, 51, and 52 connected with the LAN 31 are connected with the Internet 1 via a NAT apparatus 41. The NAT apparatus 41 performs address translation between an IP address defined as a global address on the Internet 1 and a local address defined on the LAN 31 (in some cases, IP addresses that are valid only on the LAN 31 are used as local addresses for communication within the LAN 31).

For example, when the client 11 wants to log on to the IM server 21, the client 11 produces a packet in which the local address of the client 11 is described as the source address and the IP address of the IM server 21 as the destination address, and the client 11 transmits the resultant packet. The NAT apparatus 41 replaces the source address of the packet with a combination of the IP address serving as the global address of the NAT apparatus 41 and a port number of a port to which the client 11 is connected, and the NAT apparatus 41 transmits the resultant packet to the IM server 21 via the Internet 1.

When the IM server 21 transmits a packet to the client 11, the IM server 21 describes, in the packet, the IP address serving as the global address of the IM server 21 as the source address and describes, as the destination address, the IP address described in the packet received from the NAT apparatus 41, that is the IP address serving as the global address of the NAT apparatus 41. If the NAT apparatus 41 receives this packet from the IM server 21 via the Internet 1, the NAT apparatus 41 confirms that the packet is addressed to the NAT apparatus 41, from the global address in the form of the IP address described as the destination address in the packet. The NAT apparatus 41 captures that packet and transfers the captured packet to the client 11 connected with the port with the port number described in the destination address.

Thus, although the clients 11, 51, and 52 on the LAN 31 do not have their own IP addresseees, as described above, they can communicate with other apparatus via the Internet by using in common the IP address serving as the global address of the NAT apparatus 41.

When clients are registered in the IM server 21, IP addresses serving as global addresses thereof are registered. For example, when the client 12 directly connected with the Internet 1 (without passing through a NAT apparatus) is registered, the IP address serving as the global address of the client 12 is registered. However, in the case of the client 11 connected with the Internet 1 via the NAT apparatus 41, the client 11 does not have its own IP address serving as the global address thereof, and thus the IP address serving as the global address of the NAT apparatus 41 and additional data indicating the port number of the client 11 are registered in the IM server 21.

When the client 11 wants to perform peer-to-peer communication with the client 12, if the client 11 acquires the IP address serving as the global address of the client 12 from the IM server 21, and if the client 12 acquires the IP address serving as the global address of the client 11 (NAT apparatus 41) and the additional port number, it becomes possible for the clients 11 and the client 12 to perform peer-to-peer communication using the acquired global addresses.

However, in a case in which, as shown in FIG. 4, the client 12 and the client 11 are connected with the same LAN 31, both the client 11 and the client 12 are connected with the Internet 1 via the same NAT apparatus 41. In this case, addresses necessary in peer-to-peer communication between the client 12 and the client 11 are not IP addresses serving as global addresses but local addresses defined on the LAN 32.

Thus, a user of the client 11 connected with the NAT apparatus 41 has to determine whether a local address or a global address should be used depending on whether the client 12 with which to perform peer-to-peer communication is connected with the same NAT apparatus as the NAT apparatus 41 with which the client 11 is connected. This is inconvenient for users.

SUMMARY OF THE INVENTION

In view of the above, it is an object of the present invention to make it easier for a client connected with a NAT apparatus to perform peer-to-peer communicate with another client.

According to an aspect, the present invention provides an information processing system in which a first information processing apparatus requests a third information processing apparatus to provide information associated with connection of a second information processing apparatus, the third information processing apparatus provides information associated with the connection of the second information processing apparatus to the first information processing apparatus, the first information processing apparatus determines, on the basis of the information provided by the third information processing apparatus, whether the second information processing apparatus is connected with the same network as that with which the first information processing apparatus is connected, the first information processing apparatus performs communication with the second information processing apparatus in such a manner that if the second information processing apparatus is determined to be connected with the same network as that with which the first information processing apparatus is connected, communication with the second information processing apparatus is performed on the basis of an address defined on the first network, while if the second information processing apparatus is determined not to be connected with the same network as that with which the first information processing apparatus is connected, communication with the second information processing apparatus is performed on the basis of an address defined on the second network.

The first information processing apparatus may request the third information processing apparatus to provide, as the information associated with the connection, an address, defined on the second network, of the second information processing apparatus, the third information processing apparatus may provide, as the information associated with the connection, the address, defined on the second network, of the second information processing apparatus, and the first information processing apparatus may determine, on the basis of the address, defined on the second network, of the second information processing apparatus, whether the second information processing apparatus is connected with the same network as that with which the first information processing apparatus is connected.

The first information processing apparatus may request, as the information associated with connection, information indicating whether the second information processing apparatus and the first information processing apparatus are connected with the same network, the third information processing apparatus may examine whether the second information processing apparatus and the first information processing apparatus are connected with the same network and the third information processing apparatus may provide the result of the examination as the information associated with the connection, and the first information processing apparatus may determine, on the basis of the received information indicating the result of the examination performed by the third information processing apparatus, whether the second information processing apparatus is connected with the same network as that with which the first information processing apparatus is connected.

The third information processing apparatus may examine whether the first information processing apparatus and the second information processing apparatus are connected with the same network, on the basis of addresses, defined on the second network, of the first information processing apparatus and the second information processing apparatus.

The third information processing apparatus may examine whether the second information processing apparatus and the first information processing apparatus are connected with the same address translator to examine whether the second information processing apparatus and the first information processing apparatus are connected with the same network.

The third information processing apparatus may examine whether the second information processing apparatus and the first information processing apparatus have the same address defined on the second network to examine whether the second information processing apparatus and the first information processing apparatus are connected with the same network.

The present invention also provides a first information processing method in which a first information processing apparatus requests a third information processing apparatus to provide information associated with connection of a second information processing apparatus, the third information processing apparatus provides information associated with the connection of the second information processing apparatus to the first information processing apparatus, the first information processing apparatus determines, on the basis of the information provided by the third information processing apparatus, whether the second information processing apparatus is connected with the same network as that with which the first information processing apparatus is connected, the first information processing apparatus performs communication with the second information processing apparatus in such a manner that if the second information processing apparatus is determined to be connected with the same network as that with which the first information processing apparatus is connected, communication with the second information processing apparatus is performed on the basis of an address defined on the first network, while if the second information processing apparatus is determined not to be connected with the same network as that with which the first information processing apparatus is connected, communication with the second information processing apparatus is performed on the basis of an address defined on the second network.

The present invention also provides a first information processing apparatus including request means for requesting the server to provide information associated with connection of an another information processing apparatus, reception means for receiving information associated with the connection of said another information processing apparatus from a server, and communication means for performing communication with said another information processing apparatus in such a manner that the communication means determines, on the basis of the information received from the server, whether said another information processing apparatus is connected with the same network as that with which the information processing apparatus is connected, and if it is determined that said another information processing apparatus is connected with the same network as that with which the information processing apparatus is connected, the communication means performs communication with said another information processing apparatus on the basis of an address defined on the first network, while if it is determined that said another information processing apparatus is not connected with the same network as that with which the information processing apparatus is connected, the communication means performs communication with said another information processing apparatus on the basis of an address defined on the second network.

The request means may request, as the information associated with connection, an address, defined on the second network, of said another information processing apparatus, and the communication means may determine, on the basis of the address, defined on the second network, of said another information processing apparatus, whether said another information processing apparatus is connected with the same network as that with which the information processing apparatus is connected.

The request means may request, as the information associated with connection, information indicating whether said another information processing apparatus and the information processing apparatus are connected with the same network, and the communication means may determine, on the basis of the information supplied from the server, whether said another information processing apparatus is connected with the same network as that with which the information processing apparatus is connected.

The request means may request, as the information indicating whether said another information processing apparatus and the information processing apparatus are connected with the same network, information indicating whether said another information processing apparatus and the information processing apparatus are connected with the same address translator.

The request means may request, as the information indicating whether said another information processing apparatus and the information processing apparatus are connected with the same address translator, information indicating whether said another information processing apparatus and the information processing apparatus have the same address.

The first network may be a LAN, the second network may be the Internet, the address on the first network may be a local address, and the address on the second network may be a global address.

If the information received from the server indicates that said another information processing apparatus is not connected with the same network as that with which the information processing apparatus is connected, the request means may further request the server to provide an address, defined on the second network, of the information processing apparatus.

If it is determined that said another information processing apparatus is not connected with the same network as that with which the information processing apparatus is connected, the communication means may transmit the address, defined on the second network, of the information processing apparatus to said another information processing apparatus via the server and may receive the address, defined on the second network, of said another information processing apparatus via the server.

If it is determined that said another information processing apparatus is connected with the same network as that with which the information processing apparatus is connected, the communication means may transmit the address, defined on the first network, of the information processing apparatus to said another information processing apparatus via the server and may receive the address, defined on the first network, of said another information processing apparatus via the server.

The present invention also provides a second information processing method including the steps of requesting a server to provide information associated with connection of an another information processing apparatus, receiving information associated with the connection of said another information processing apparatus from the server, and performing communication with said another information processing apparatus in such a manner that determination as to whether said another information processing apparatus is connected with the same network as that with which the information processing apparatus is connected is made on the basis of the information received from the server, and if it is determined that said another information processing apparatus is connected with the same network as that with which the information processing apparatus is connected, communication with said another information processing apparatus is performed on the basis of an address defined on the first network, while if it is determined that said another information processing apparatus is not connected with the same network as that with which the information processing apparatus is connected, communication with said another information processing apparatus is performed on the basis of an address defined on the second network.

The present invention also provides a program for causing a computer to perform processing including the steps of requesting a server to provide information associated with connection of an another information processing apparatus, receiving information associated with the connection of said another information processing apparatus from the server, and performing-communication with said another information processing apparatus in such a manner that determination as to whether said another information processing apparatus is connected with the same network as that with which the information processing apparatus is connected is made on the basis of the information received from the server, and if it is determined that said another information processing apparatus is connected with the same network as that with which the information processing apparatus is connected, communication with said another information processing apparatus is performed on the basis of an address defined on the first network, while if it is determined that said another information processing apparatus is not connected with the same network as that with which the information processing apparatus is connected, communication with said another information processing apparatus is performed on the basis of an address defined on the second network.

The present invention also provides a second information processing apparatus including reception means for receiving, from a first apparatus, a request for determination as to whether the second apparatus is connected with the same network as that with which a first apparatus is connected, examination means for examining whether the second apparatus is connected with the same network as that with which the first apparatus is connected, and informing means for informing the first apparatus of the result of the examination performed by the examination means.

The examination means may examine whether the first apparatus and the second apparatus are connected with the same address translator to examine whether the second apparatus is connected with the same network as that with which the first apparatus is connected.

The examination means examine whether the first apparatus and the second apparatus have the same address to examine whether the fist apparatus and the second apparatus are connected with the same address translator.

The first network may be a LAN, the second network may be the Internet, the address on the first network may be a local address, and the address on the second network may be a global address. The informing means may transmit 1-bit data indicating the result of the examination performed by the examination means to the first apparatus.

The present invention also provides a third information processing method including the steps of receiving, from the first apparatus, a request for determination as to whether the second apparatus is connected with the same network as that with which the first apparatus is connected, examining whether the second apparatus is connected with the same network as that with which the first apparatus is connected, and informing the first apparatus of the result of the examination performed in the examination step.

The present invention also provides a second program for causing a computer to perform processing including the steps of receiving, from the first apparatus, a request for determination as to whether the second apparatus is connected with the same network as that with which the first apparatus is connected, examining whether the second apparatus is connected with the same network as that with which the first apparatus is connected, and informing the first apparatus of the result of the examination performed in the examination step.

In the first aspect of the present invention, as described above, the third information processing apparatus provides information associated with the connection of the second information processing apparatus to the first information processing apparatus. The first information processing apparatus determines, on the basis of the information provided by the third information processing apparatus, whether the second information processing apparatus is connected with the same network as that with which the first information processing apparatus is connected. If it is determined that the second information processing apparatus is connected with the same network as that with which the first information processing apparatus is connected, communication with the second information processing apparatus is performed on the basis of an address defined on the first network. On the other hand, if it is determined that the second information processing apparatus is not connected with the same network as that with which the first information processing apparatus is connected, communication with the second information processing apparatus is performed on the basis of an address defined on the second network.

In the second aspect of the present invention, as described above, the server determines, in response to a request, whether said another information processing apparatus and the information processing apparatus are connected with the same network. When the result of the determination performed by the server indicates that said another information processing apparatus and the information processing apparatus are connected with the same network, communication with said another information processing apparatus is performed on the basis of an address defined on the first network. On the other hand, if said another information processing apparatus is determined not to be connected with the same network as that with which the information processing apparatus is connected, communication with said another information processing apparatus is performed on the basis of an address defined on the second network.

In the third aspect of the present invention, as described above, if a request for determination as to whether a second one of the other information apparatuses is connected with the same network as that with which a first one of the other information apparatuses is connected is received from the first one of the other information processing apparatuses, an examination is performed as to whether the second one of the other information apparatuses is connected with the same network as that with which the first one of the other information apparatuses is connected, and the result of the examination is informed to the first one of the other information processing apparatuses.

According to the first aspect of the present invention, it is possible to realize a system in which a first information processing apparatus and a second information processing apparatus can directly communicate with each other. In particular, direct communication can be easily performed regardless of whether the second information processing apparatus is connected with the first network or the second network, without necessitating that the first information processing apparatus must directly manage the address, defined on the first network, of the second information processing apparatus.

According to the second aspect of the present invention, direct communication with one of the other information processing apparatuses is possible. In particular, when the information processing apparatus is connected with the second network via an address translator, direct communication can be easily performed regardless of whether the one of the other information processing apparatuses is connected with the first network or the second network. Also in this case, it is not needed to directly manage the address, defined on the first network, of that one of the other information communication apparatuses.

According to the third aspect of the present invention, it makes it possible for a first one of the other information processing apparatuses and a second one of the other information processing apparatus to communicate with each other via the first network. In particular, when the second one of the other information processing apparatuses is connected with the second network via an address translator, it is possible to easily perform direct communication regardless of whether the second one of the other information processing apparatuses is connected with the first network or the second network, without necessitating that the first information processing apparatus must manage the address, defined on the first network, of the second information processing apparatus.

DESCRIPTION OF THE PREFERRED EMBODIMENTS

Figure 1:
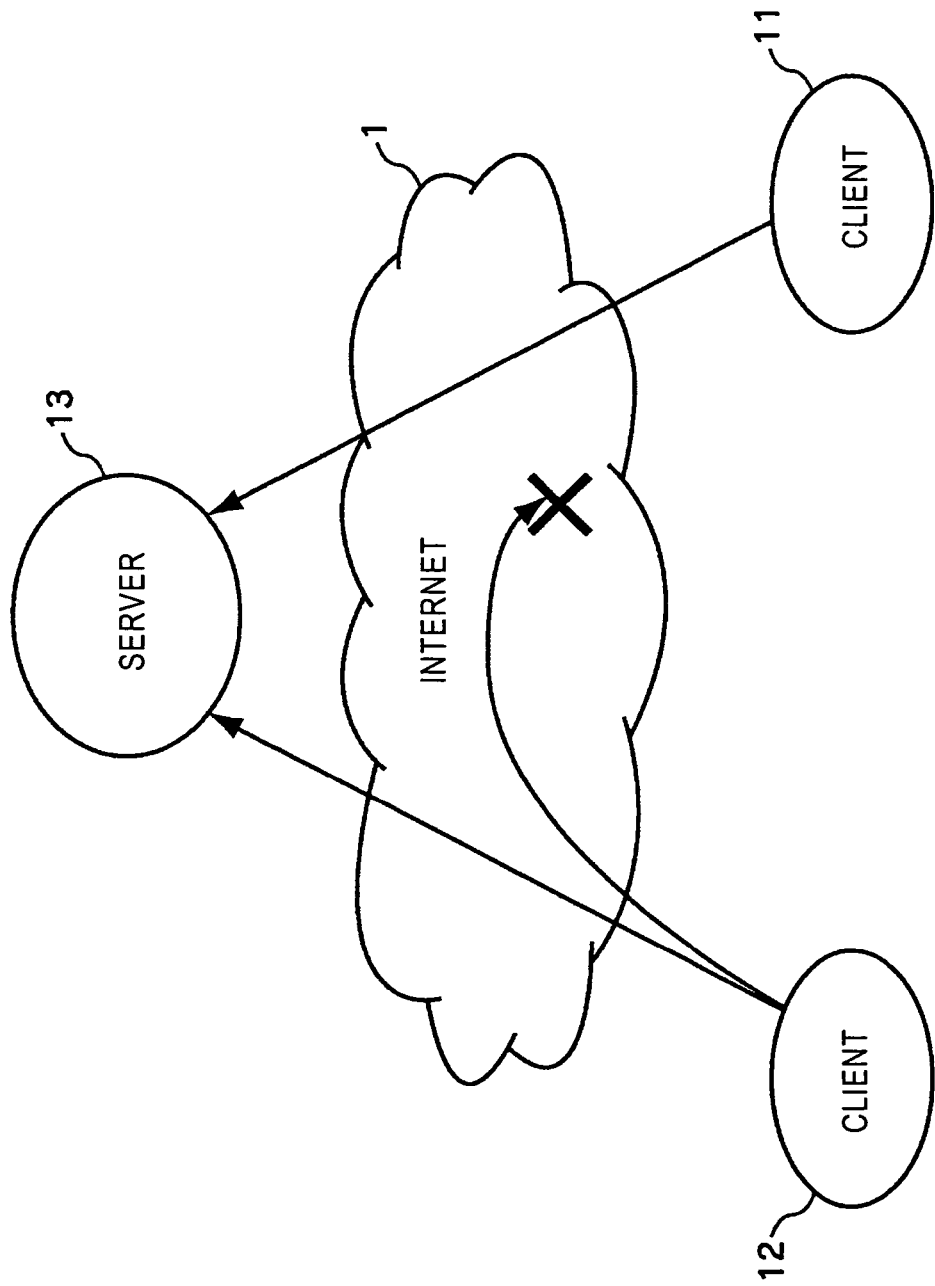
FIG. 1 is a diagram showing an example of a conventional information processing system.
Figure 2:
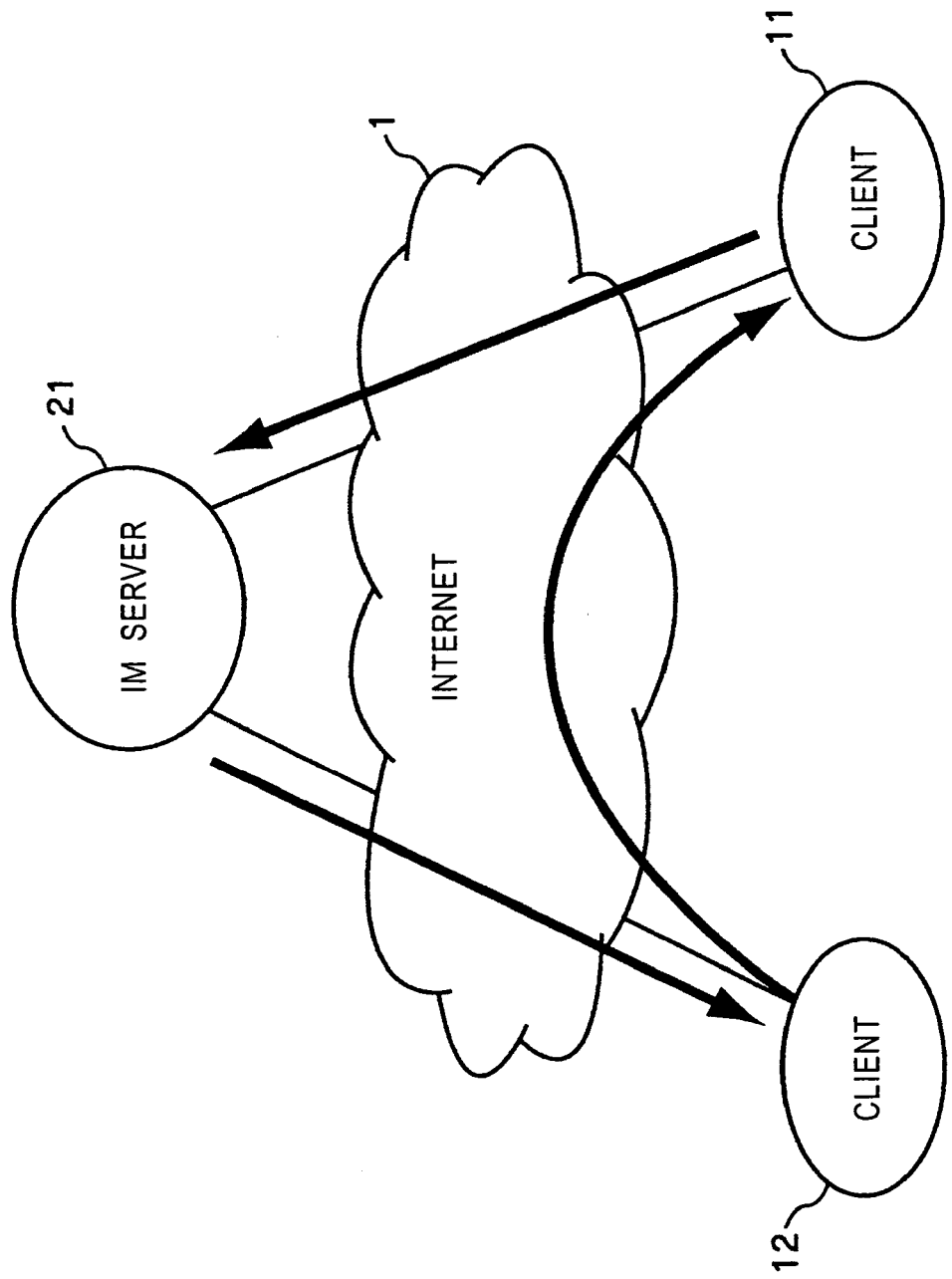
FIG. 2 is a diagram showing another example of a conventional information processing system.
Figure 3:
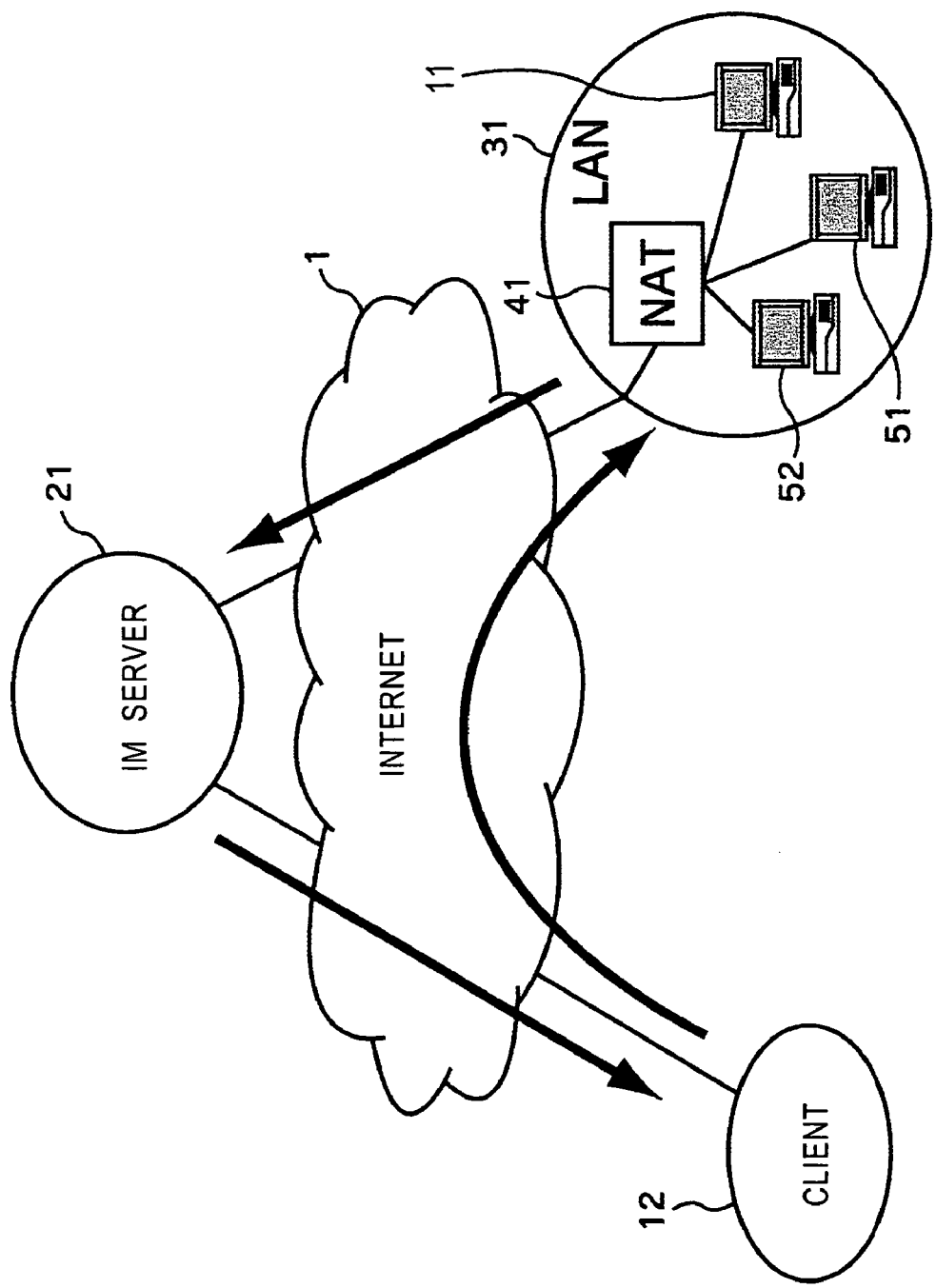
FIG. 3 is a diagram showing another example of a conventional information processing system.
Figure 4:
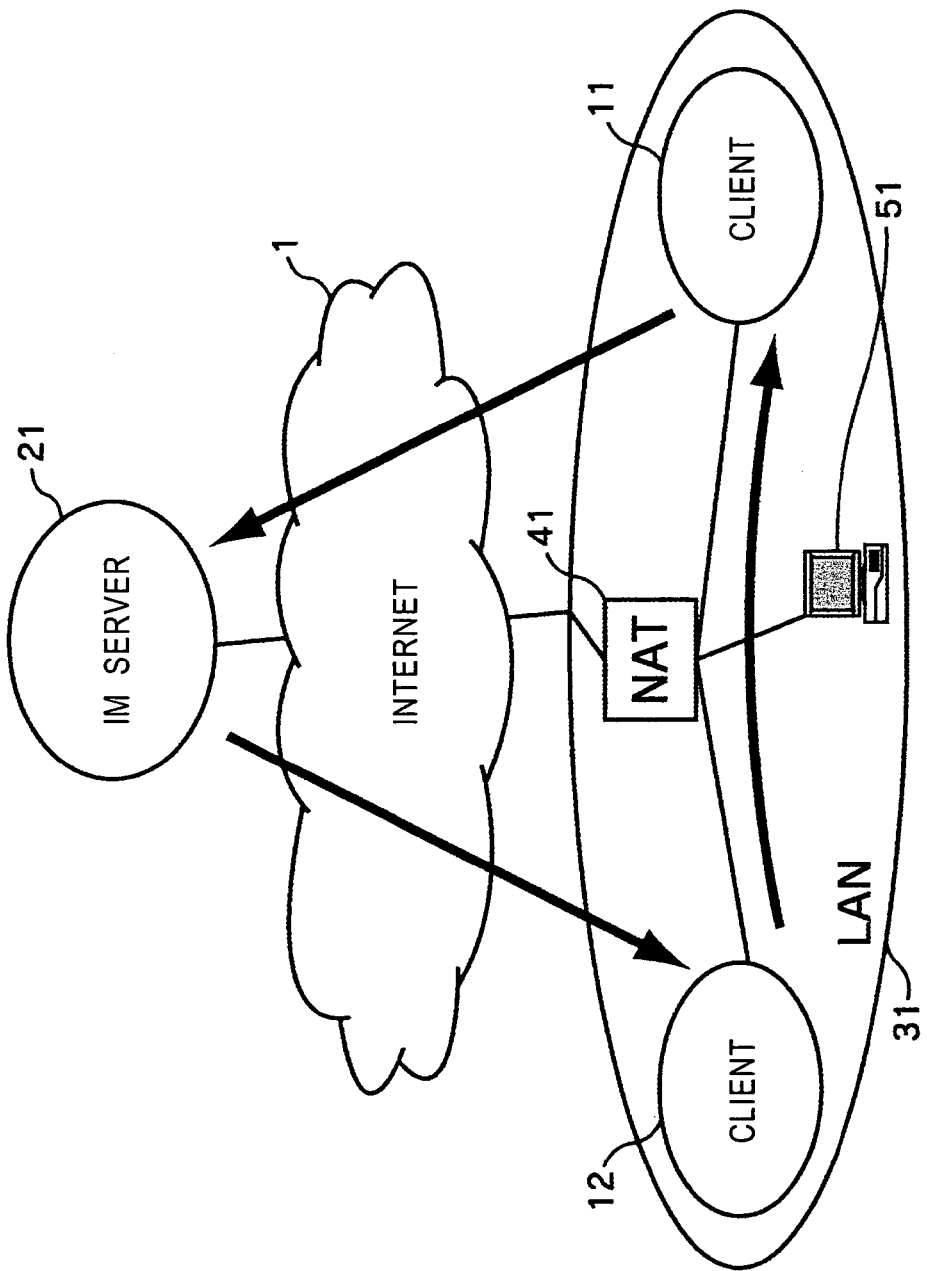
FIG. 4 is a diagram showing another example of a conventional information processing system.
Figure 5:
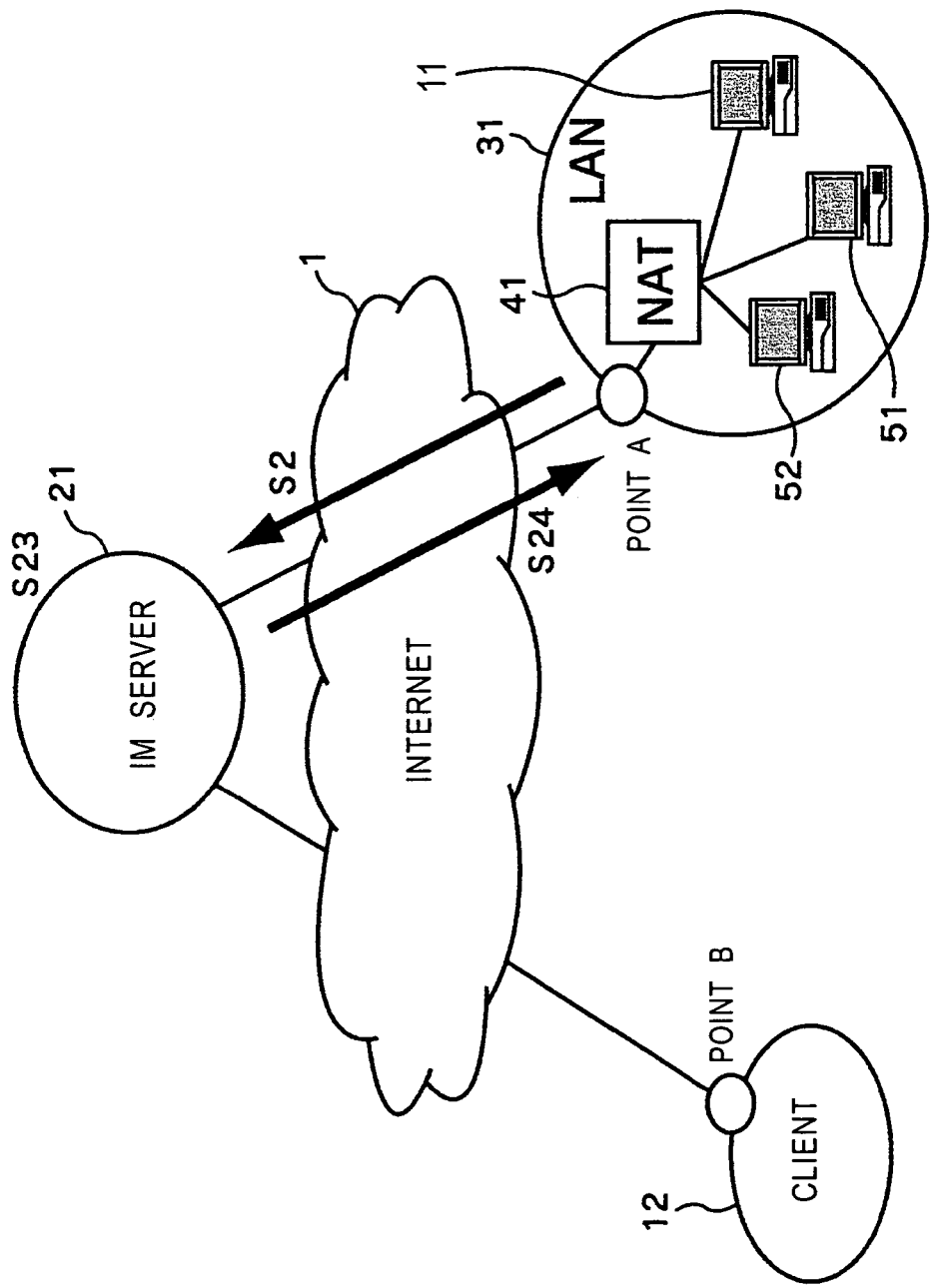
FIG. 5 is a diagram showing an example of a configuration of an information processing system according to the present invention.

FIG. 5 shows an embodiment of an information processing system according to the present invention. In FIG. 5, similar parts to those in FIGS. 1 to 4 are denoted by similar reference numerals.

In the specific example shown in FIG. 5, a IM server 21 is connected with the Internet 1, and a client 12 is connected, in the outside of a NAT apparatus 41, with the Internet 1. On the other hand, clients 11, 51, and 52 are connected with a LAN 31 and further connected with the Internet 1 via the NAT apparatus 41.

Because the client 12 is directly connected with the Internet 1 without passing through a NAT apparatus, an address assigned to point B, viewed from the Internet 1, at which the client 12 is located is registered as the address of the client 12 in the IM server 21. Note that the address assigned to the point B is an IP address serving as a global address of the client 12.

On the other hand, because the client 11 is connected with the Internet 1 via the NAT apparatus 41, when the client 11 is viewed from the Internet 11, the client 11 seems to be located at point A, and thus an address of the point A is registered as the address of the client 11 in the IM server 21. Note that the address of the point A is an IP address serving as a global address of the NAT apparatus 41.

In the present invention, clients are allowed to be connected in a similar manner as in the conventional information processing system. That is, when the client 12, with which the client 11 is going to communicate, is connected with the same NAT apparatus as that with which the client 11 is connected, the connection state becomes similar to that shown in FIG. 4.

Figure 6:
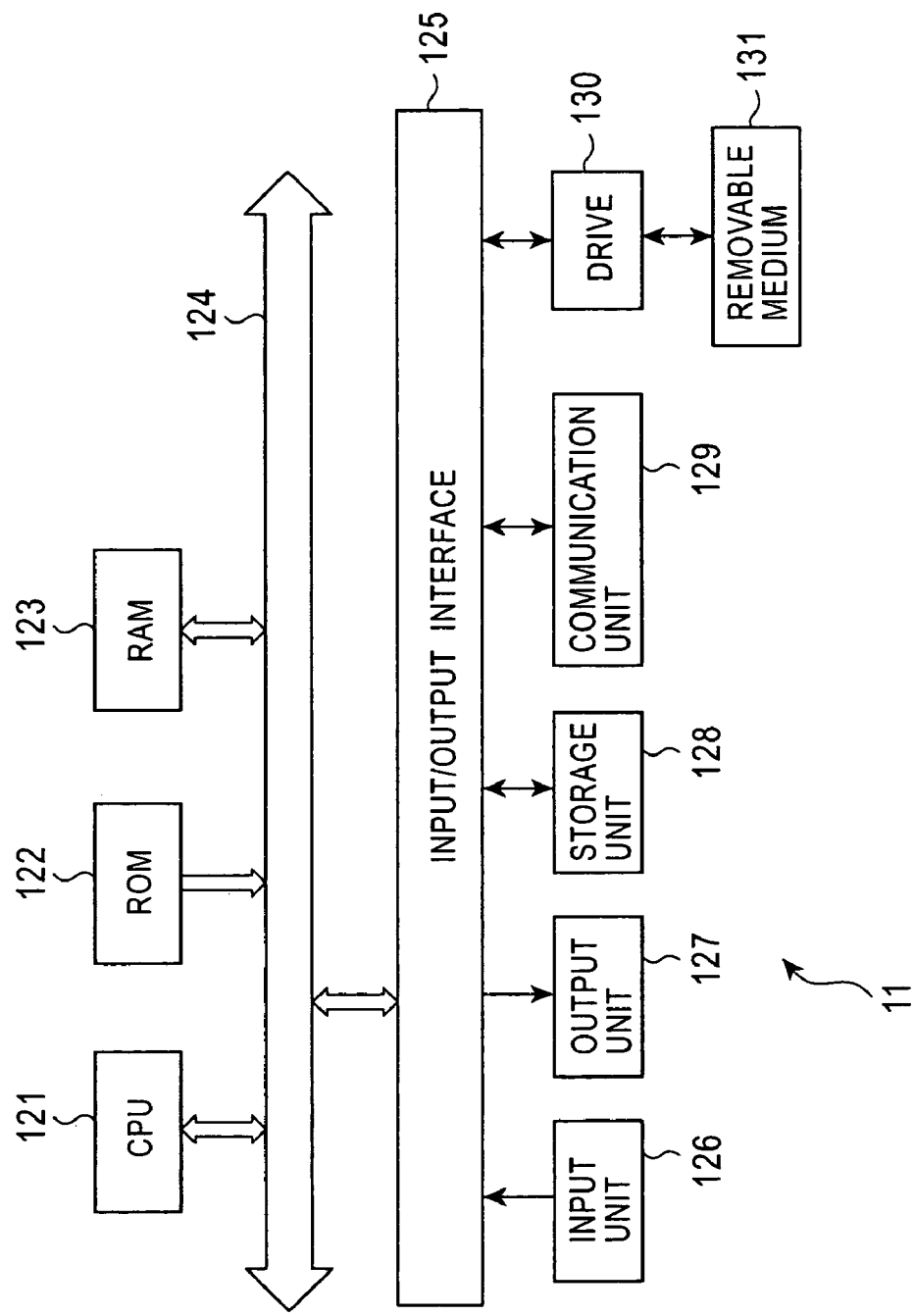
FIG. 6 is a block diagram showing an example of a construction of a client shown in FIG. 5.

FIG. 6 shows an example of a construction of the client 11, wherein a personal computer is used as the client 11 in this specific example. In FIG. 6, a CPU (Central Processing Unit) 121 performs various kinds of processing in accordance with programs stored in a ROM (Read Only Memory) 122 or loaded in a RAM (Random Access Memory) 123 from a storage unit 128. The RAM 123 also stores data used by the CPU 121 in processing.

The CPU 121, the ROM 122 and the RAM 123 are connected with each other via a bus 124. The bus 124 is also connected with an input/output interface 125.

The input/output interface 125 is also connected with an input unit 126 including a keyboard, mouse, and the like, an output unit 127 including a display such as a CRT (Cathode Ray Tube) or a LCD (Liquid Crystal Display) and a speaker, a storage unit 128 such as a hard disk, and a communication unit 129 such as a modem. The communication unit 129 is responsible for communication via a network such as the Internet 1 or the LAN 31.

A drive 130 is also connected with the input/output interface 125 as required, and a removable medium 131 such as a magnetic disk, an optical disk, a magnetooptical disk, or a semiconductor memory is mounted on the drive 130, as required, to install a computer program therefrom into the storage unit 128.

Figure 7:
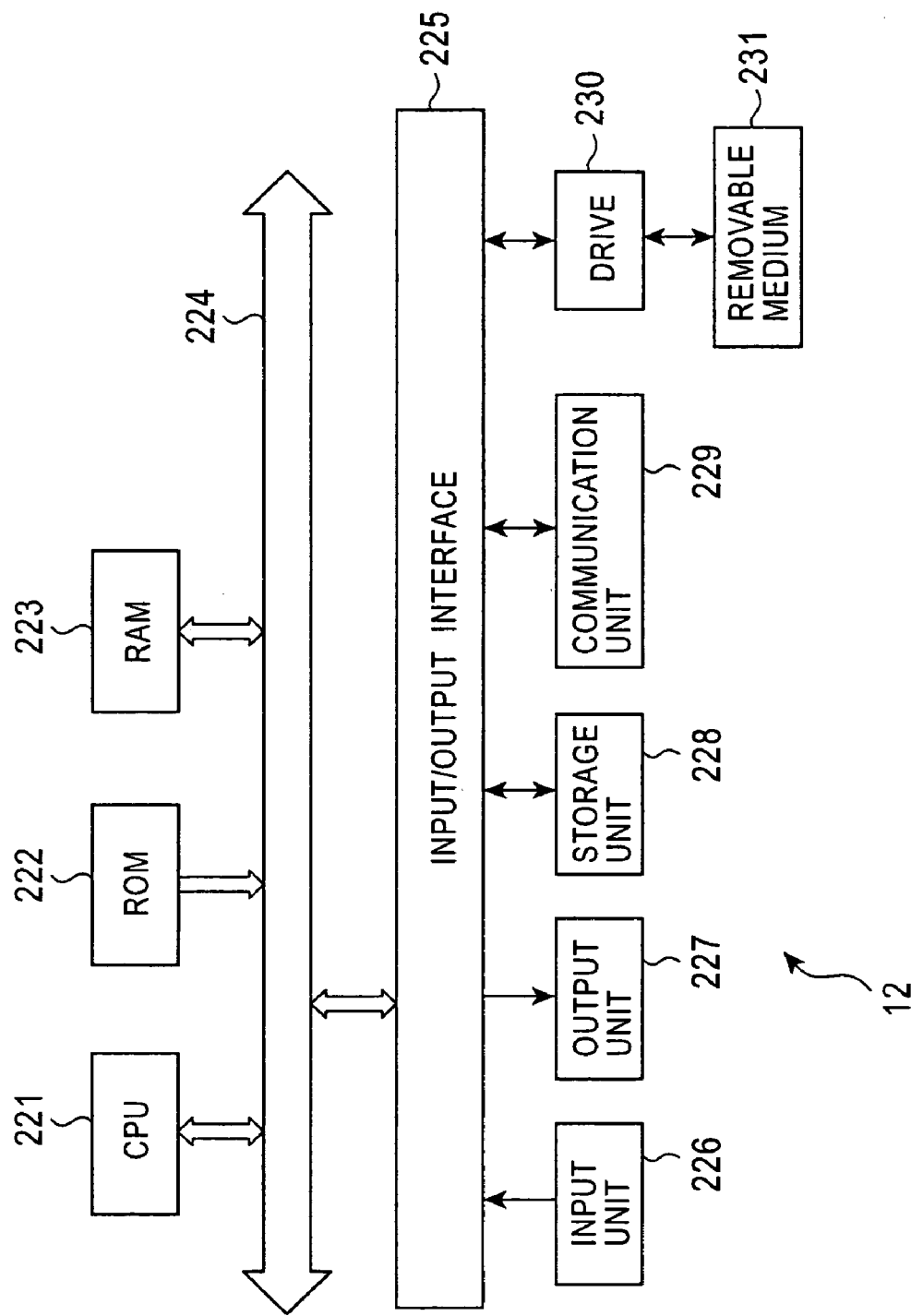
FIG. 7 is a block diagram showing an example of a construction of another client shown in FIG. 5.

FIG. 7 shows an example of a construction of the client 12, wherein a personal computer is used as the client 12 in this specific example. In this example, the client 12 has a construction basically similar to that of the client 11 shown in FIG. 6. That is, the client 12 also has components including a CPU 221, ..., and a removable medium 231 similar to the corresponding components such as the CPU 121, ..., and the removable medium 131 of the client 11.

Figure 8:
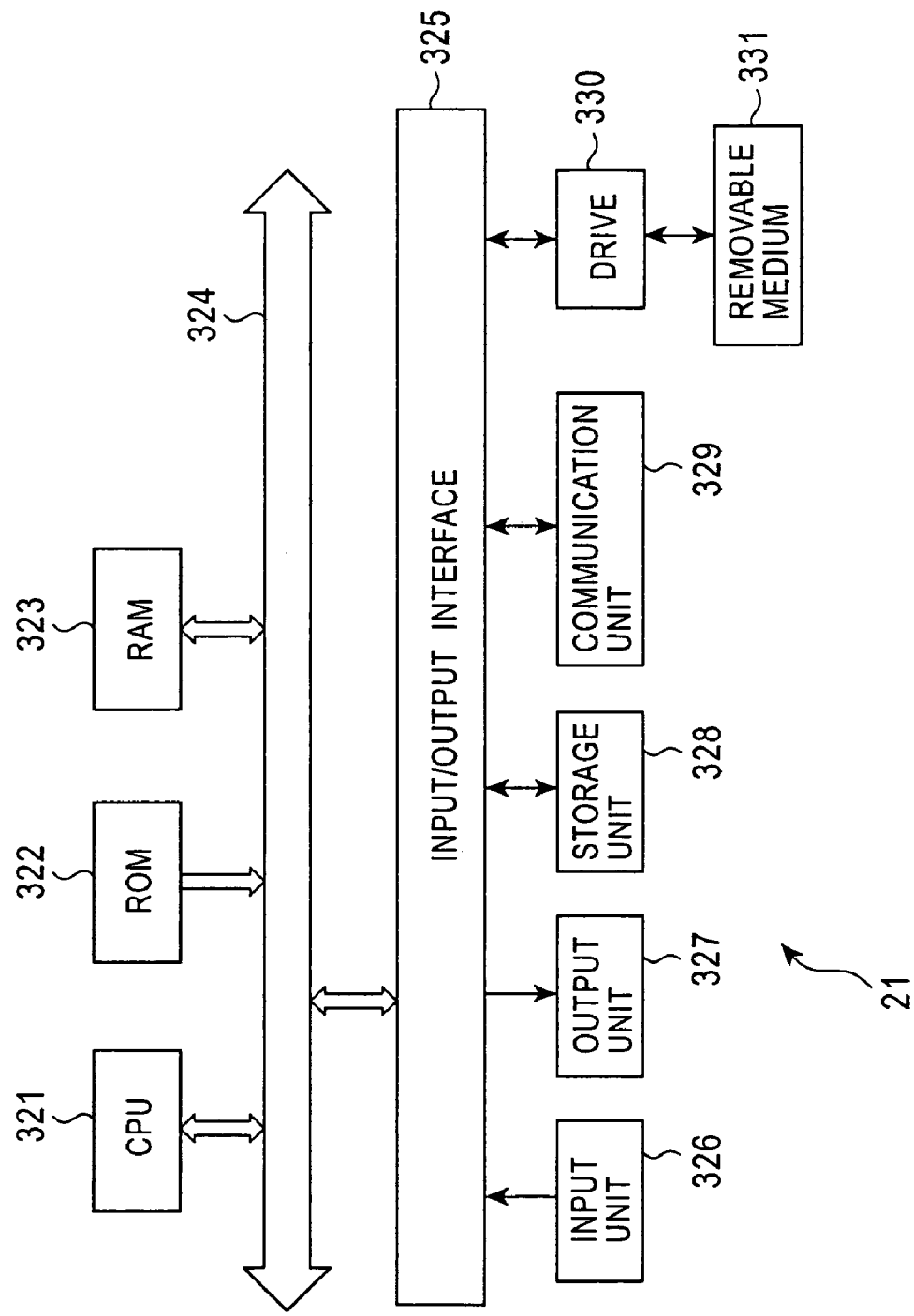
FIG. 8 a block diagram showing an example of a construction of a IM server shown in FIG. 5.

FIG. 8 shows an example of a construction of the IM server 21. The IM server 21 also has a construction basically similar to that of the client 11 shown in FIG. 6. That is, the IM server 21 shown in FIG. 8 also has components including a CPU 321, ..., and a removable medium 331 similar to the corresponding components such as the CPU 121, ..., and the removable medium 131 of the client 11 shown in FIG. 6.

A process of peer-to-peer communication with one of the other clients, performed by the client 11 connected to the NAT apparatus 41, is described below with reference to a flow chart shown in FIG. 9. Herein it is assumed that clients 11, 12, 51, and 52 are already registered in the IM server 21. It is also assumed that the client 12 is already registered in the buddy list of the client 11 and the client 11 is already registered in the buddy list of the client 12. Note that the IP address of the point A of the NAT apparatus 41 is registered as the address of the client 11, and the IP address of the point B is registered as the address of the client 12.

In step S1, the CPU 121 of the client 11 controls the communication unit 129 to get access to the IM server 21. In step S2, the CPU 121 issues a request for, as information associated with connection of a client (the client 12 in this specific example) with which the client 11 is going to communicate, information indicating whether the address of that client is identical to the address of the client 11. Upon receiving the request from the client 11 via the communication unit 329, the CPU 321 of the IM server 21 examines the registered address of the client 12 and determines whether the address of the client 12 is identical to the registered address of the client 11. The CPU 321 of the IM server 21 informs the client 11 of the result of the determination (in step S24 described later with reference in FIG. 10).

In step S3, the CPU 121 of the client 11 receives, via the communication unit 129, the notification of the result of the determination transmitted from the IM server 21 via the Internet 1. In step S4, the CPU 121 determines, on the basis of the result of the determination notified in step S3, whether the client 12 (that is one of the clients registered in the buddy list of the client 11 and that is a client with which the client 11 is going to communicate) is connected with the same network as that with which the client 11 is connected. More specifically, it is determined whether the address of the client 12 registered in the IM server 21 is identical to the address of the client 11 registered in the IM server 21. The result of the determination performed by the IM server 21 is transmitted in the form of 1-bit data, and thus the CPU 121 can quickly make correct determination as to whether the client 12 is connected with the same network as that with which the client 11 is connected. That is, when the data is equal to logical 1, the data indicates that the both addresses are identical to each other. However, when the data is equal to logical 0, the data indicates that the addresses are not equal to each other.

If it is determined in step S4 that the addresses are equal to each other, it is concluded that the client 12 is connected with the LAN 31 with which the client 11 is also connected (that is, clients are connected not in such a manner as shown in FIG. 5 but in such a manner as shown in FIG. 4). As described earlier with reference to FIG. 3, when IP addresses serving as global addresses of clients are identical to each other, it can be concluded that those clients are communicating with the IM server 21 via the same NAT apparatus. That is, it can be concluded that the two clients are connected with the same NAT apparatus, i.e., the two clients are connected with the same LAN. Thus, in this case, in step S5, the CPU 121 determines that communication going to be performed must be on the local address basis. Thus, in step S6, the CPU 121 performs communication on the local address basis. In this local address-based communication, the client 12 performs peer-to-peer communication with the client 12 on the basis of local addresses defined on the LAN 31, as will be described in further detail later with reference to a flow chart shown in FIG. 11.

In a case in which it is determined in step S4 that the addresses are not identical to each other, it can be concluded that the client 12 is not connected with the LAN 31 with which the client 11 is connected and thus clients are connected in such a manner as shown in FIG. 5. Therefore, in the case in which it is determined in step S4 that the addresses of the client 12 and the client 11 are not identical to each other (that is, when it is determined the addresses are different from each other), the CPU 121 determines, in step S7, that communication with that client should be on a global address basis. Thus, in step S8, the CPU 121 performs communication on the global address basis. In this global address-based communication, the CPU 121 performs communication with the client 12 as will be described in further detail later with reference to a flow chart shown in FIG. 13.

Figure 10:
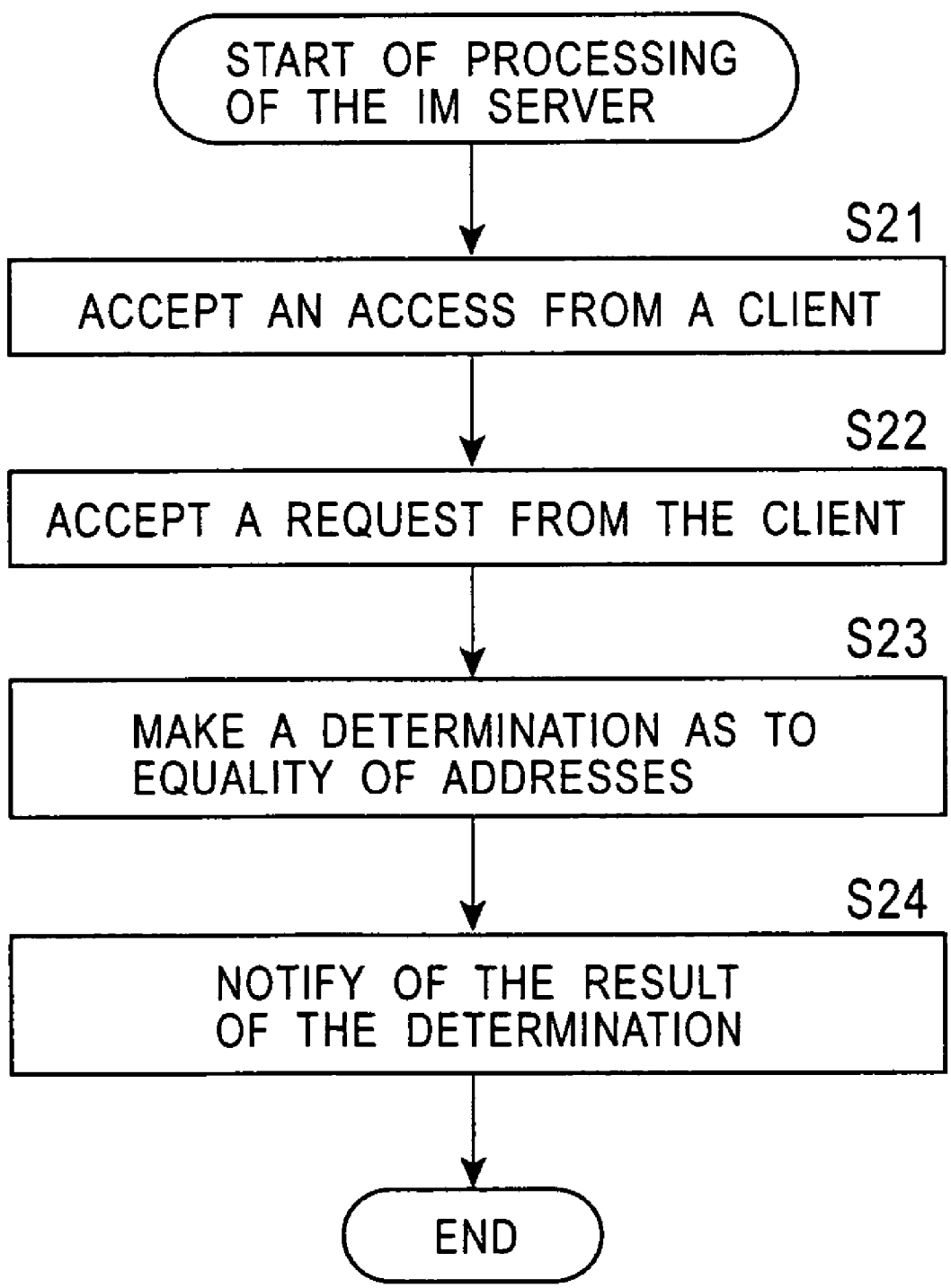
FIG. 10 is a flow chart showing a process performed by the IM server shown in FIG. 5.

When the process described above is performed by the client 11, a process shown in a flow chart of FIG. 10 is performed by the IM server 21.

That is, in step S21, the CPU 321 of the IM server 21 accepts an access from the client 11. In step S22, the CPU 321 of the IM server 21 accepts a request, issued in step S2 by the client 11, for determination as to whether the registered address of one of the other clients (the client 12, in this specific example) is identical to the registered address of the client 11.

In step S23, the CPU 321 reads (examines) the registered address of the client 12 (the IP address serving as the global address of the point B) and the registered address of the client 11 (the IP address serving as the global address of the point A) from the storage unit 328, and the CPU 321 determines whether those two registered addresses are identical to each other.

In the step S23 described above, in a case in which a plurality of successive IP addresses are assigned to clients connected with the LAN 31, the determination as to equality of addresses may be performed on the basis of addresses whose low-order digits are masked. In many cases in which a single apparatus has a plurality of global addresses, high-order digits of the plurality of global addresses are identical to each other, and only low-order digits are different from each other. When it turns out that two clients communicating with the IM server 21 have global addresses whose high-order digits are identical to each other, it can be concluded that those two clients are communicating with each other via the same NAT apparatus having the plurality of global addresses. That is, it can be concluded that the those two clients are connected with the same LAN. That is, in response to a request issued by the client 11 for examination as to whether the client 12 is connected with the same NAT apparatus as that with which the client 11 is connected, the IM server 21 performs the requested examination by examining whether the clients 11 and 12 have the same global address.

In step S24, the CPU 321 transmits 1-bit data indicating the result of the determination performed in step S23 to the client 11 via the communication unit 329.

That is, when the data is equal to logical 1, the data indicates that the both addresses are identical to each other. However, when the data is equal to logical 0, the data indicates that the addresses are not equal to each other. Use of 1-bit data to inform of the result of determination allows a reduction in traffic on the Internet 1. Besides, use of 1-bit data makes it possible for even an apparatus having rather poor power of performing processing, such as a portable information processing apparatus (for example, a portable telephone or a PDA (Personal Digital Assistants) device), to easily deal with the data.

Figure 9:
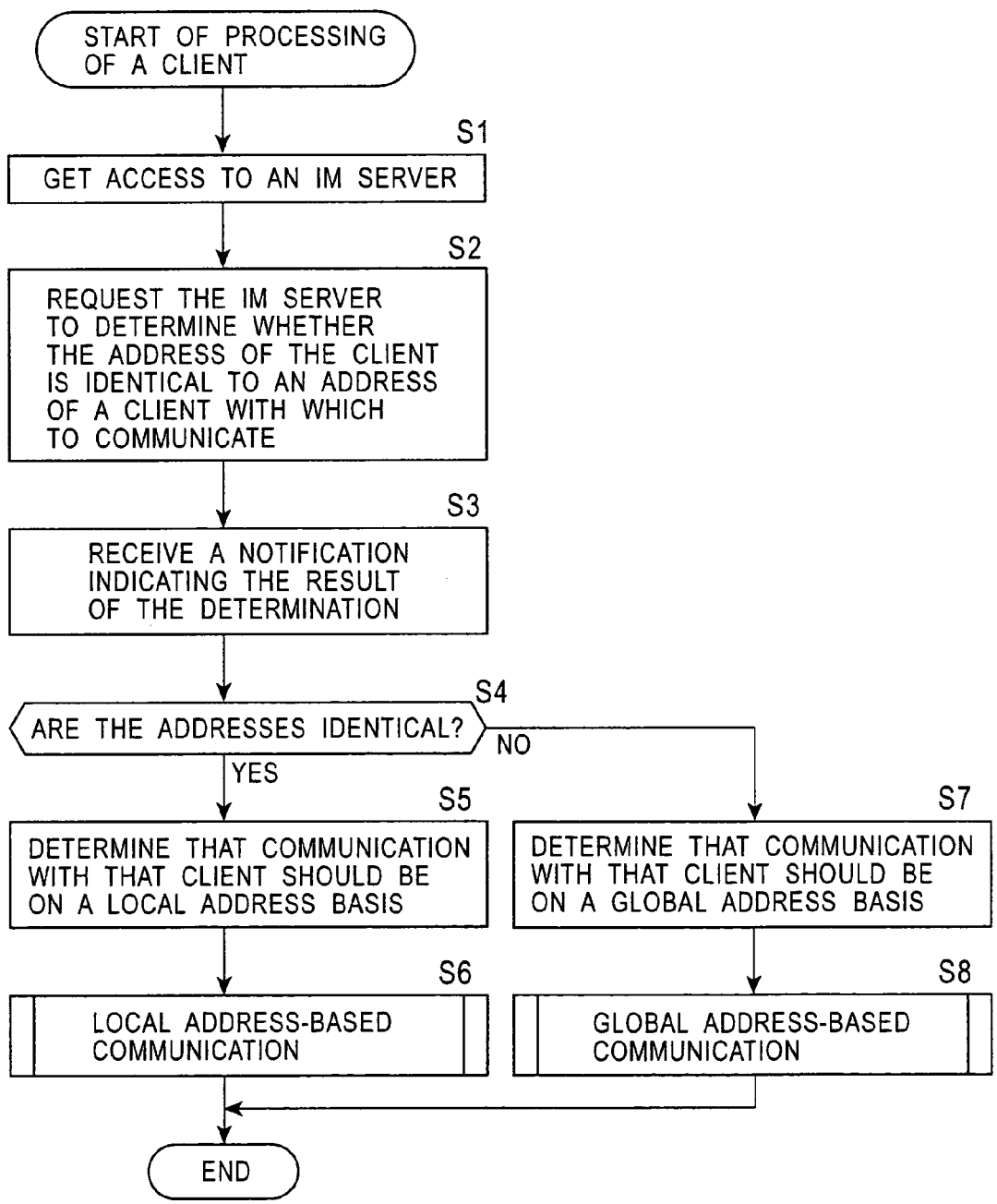
FIG. 9 is a flow chart showing a process performed by a client shown in FIG. 5.

Now, the details of local address-based communication in step S6 shown in FIG. 9 are described below with reference to a flow chart shown in FIG. 11. In the local address-based communication, as described earlier, communication is performed in a situation in which the clients 11 and the client 12 are connected with the same LAN (the same NAT apparatus) as shown in FIG. 4.

In step S51, the CPU 121 of the client 11 controls the communication unit 129 to transmit via the IM server 21 information indicating the local address of the client 11 (the address of the client 11 defined on the LAN 31) to the client 12 with which the client 11 is going to communicate on the local address basis. The client 11 connected with the LAN 31 knows the local address of the client 11 defined on the LAN 31.

Upon receiving the notification of the local address from the client 11, the IM server 21 transfers the received notification to the client 12. Thus, the client 12 gets information indicating the local address of the client 11.

In step S52, the CPU 121 requests, via the IM server 21, the client (the client 12 in this specific example), with which the client 11 is going to perform communication on the local address basis, to notify of the local address of the client 12. If the IM server 21 receives this request from the client 11, the IM server 21 transfers the request to the client 12. In response to the request, the client 12 transmits information indicating the local address of the client 12 to the client 11 (in step S73 described later with reference to FIG. 12).

In step S53, the CPU 121 receives, from the client 12 via the IM server 21, the information indicating the local address of the client (the client 12 in this specific example) with which the client 11 is going to communication on the local address basis.

Thus, the CPU 121 of the client 11 gets information indicating the local address of the client 12, and the client 12 gets information indicating the local address of the client 11. In step S54, the CPU 121 directly establishes a session on the basis of the local address of the client 12 within the LAN 31 for communication with the client 12 and performs peer-to-peer communication without passing through the IM server 21.

In a case in which one-way communication from the client 12 to the client 11 is performed, steps S52 and S53 are skipped. In the case of two-way communication, the response to the request for the address issued in step S52 by the client 11 may be transmitted from the client 12 by means of peer-to-peer communication without passing through the IM server 21, and the client 11 may receive this response in step S53. Alternatively, because the client 12 can get the local address of the client 11 from the notification issued in step S51, the client 12 may transmit notification of the local address of the client 12 to the client 11 by means of peer-to-peer communication or via the IM server 21 without waiting for reception of the request issued in step S52 by the client 11 (that is, the notification in step S51 is regarded as including the notification in step S52).

Figure 11:
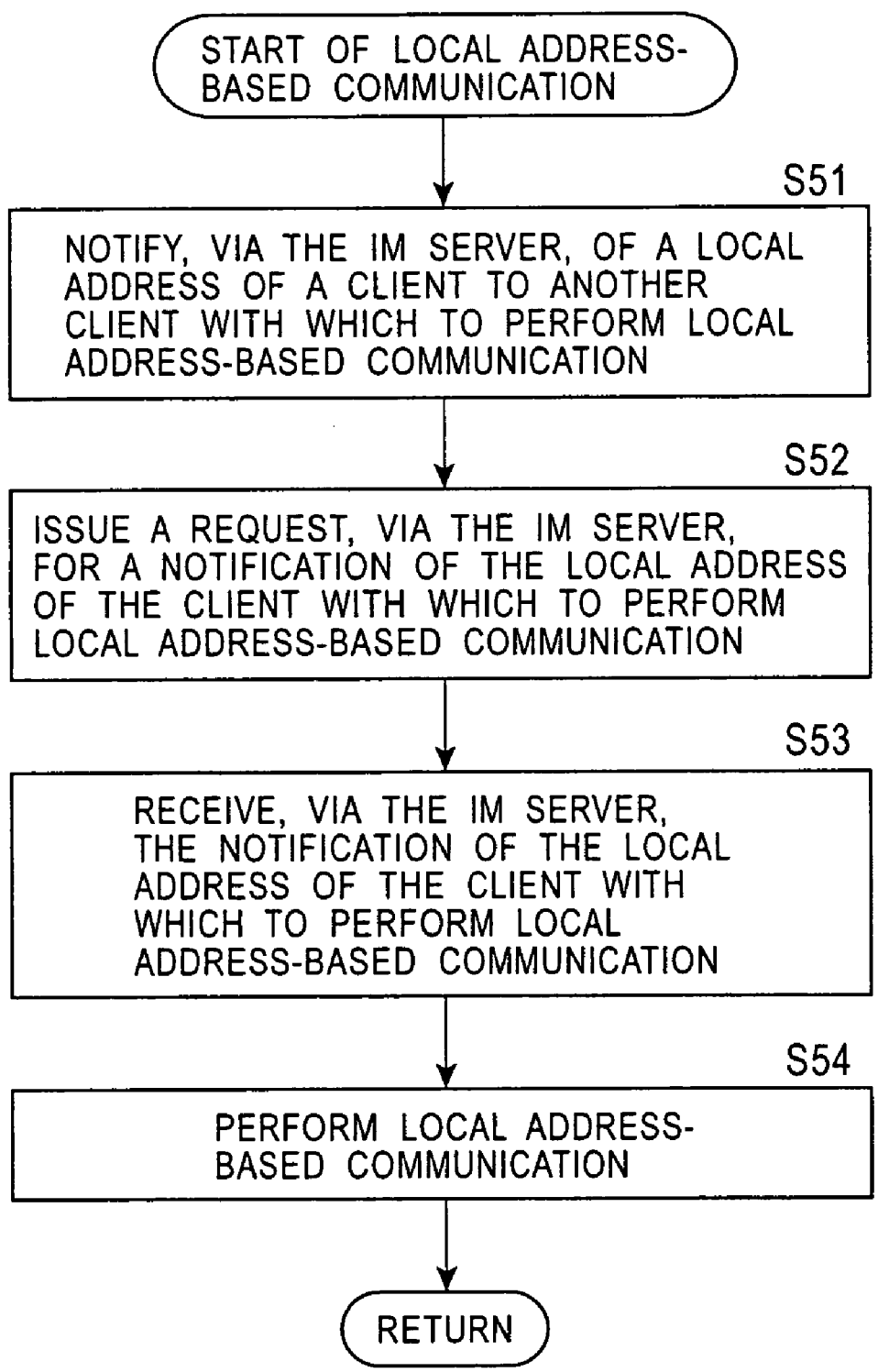
FIG. 11 is a flow chart showing the details of a local address-based communication in step S6 in FIG. 9.
Figure 12:
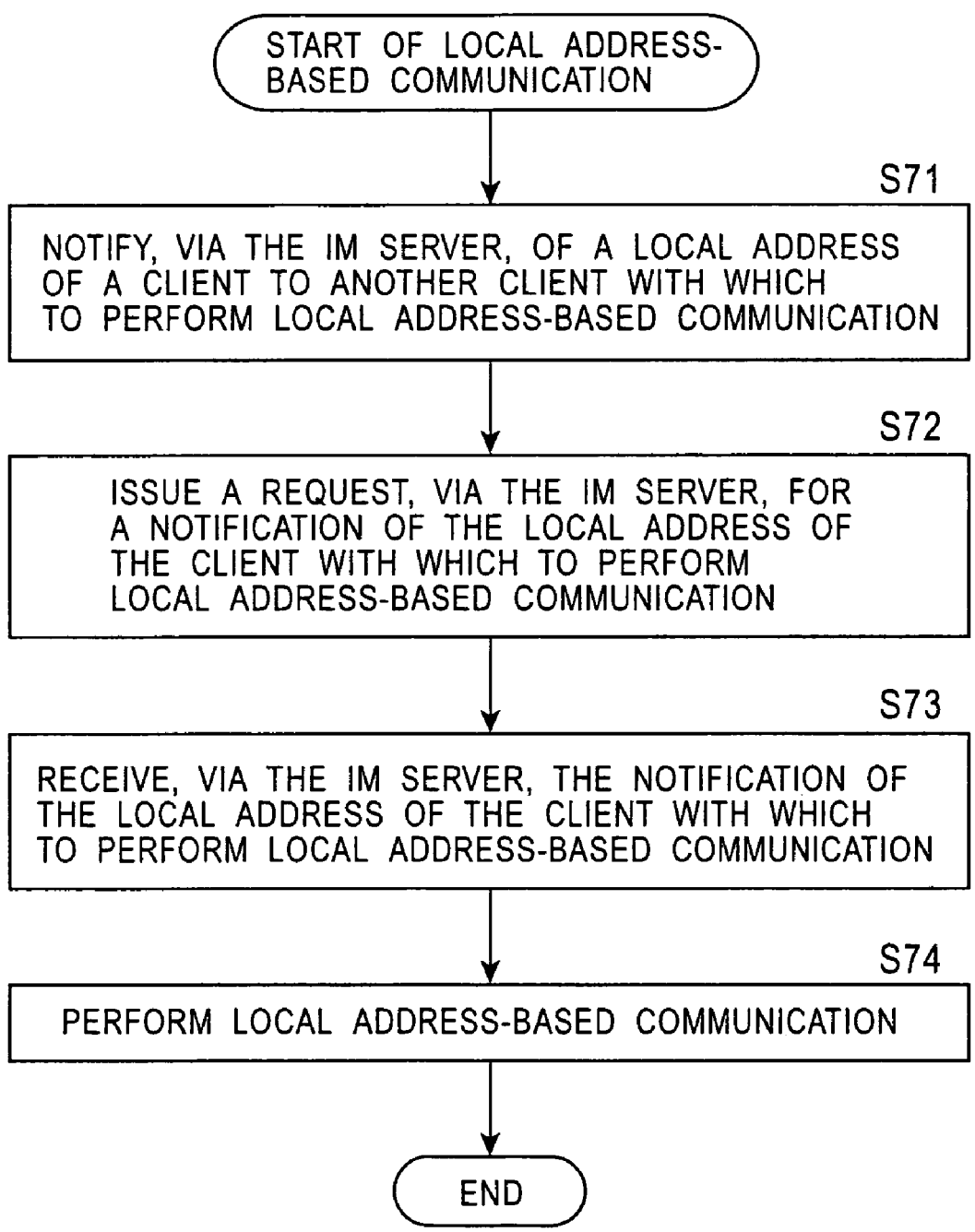
FIG. 12 is a flow chart showing a process of local address-based communication performed by another client in response to the process of local address-based communication shown in FIG. 11.

When the above-described process shown in FIG. 11 is performed by the client 11, the client 12 performs a process shown in the form of a flow chart in FIG. 12.

That is, in step S71, the CPU 221 of the client 12 receives via the communication unit 229 the notification output in step S51 from the client 11. This notification has been transmitted by the client 11 via the IM server 21 to notify the client 12 of the local address of the client 11. From this notification, the CPU 221 of the client 12 can know the local address of the client 11.

In step S72, the CPU 221 controls the communication unit 229 to receive via the IM server 21 a request for notification of the local address of the client 12, issued by a client (the client 11 in this specific example) with which local address-based communication is going to be performed. This request has been issued in step S52 in FIG. 11 by the client 11. Upon receiving the above request, the CPU 221 transmits, in step S73, notification of the local address of the client 12 via the IM server 21 to the client with which a local address-based communication is going to be performed (i.e., the client that has issued the above request (the client 11, in this specific example)). The notification is received in step S53 in FIG. 11 by the client 11.

Thus, the client 12 has gotten information indicating the local address of the client 11, and the client 11 has gotten information indicating the local address of the client 12. Thus, in step S74, the CPU 221 establishes a session on the basis of the local address of the client 11 within the LAN 31 for communication with the client 11 and performs peer-to-peer communication without passing through the IM server 21.

In the case in which one-way communication from the client 12 to the client 11 is performed, steps S72 and S73 are skipped. In the case of two-way communication, the notification of the local address of the client 12 to the client 11 in step S73 may be performed by means of peer-to-peer communication. Furthermore, when the notification is received in step S71, in response to the notification, the address of the client 12 may be notified to the client 11 via the IM server 21 or by means of peer-to-peer communication without waiting for reception of the request in step S72 (that is, the notification received in step S71 is regarded as including the request for the notification issued in step S72).

The details of the global address-based communication in step S8 in FIG. 9 are described below with reference to a flow chart shown in FIG. 13. The global address-based communication is performed in a situation in which, as shown in FIG. 5, the client 12 is not connected with the LAN 31 with which the client 11 is connected.

In step S101, the CPU 121 of the client 11 requests the IM server 21 to provide notification of the global address of the client 11. That is, because the client 11 is connected with the Internet 1 via the NAT apparatus 41, the CPU 121 cannot directly know the global address (IP address) of point A of the NAT apparatus 41. Therefore, the CPU 121 requests the IM server 21 to provide notification of the IP address of the point A of the NAT apparatus 41 witch which the client 11 is connected. In response to the request, the IM server 21 transmits notification of the global address (IP address) of the client 11 (NAT apparatus 41) to the client 11 (in step S143 described later with reference to FIG. 15). In step S102, the CPU 121 receives the notification of the global address transmitted from the IM server 21. Thus, the CPU 121 has gotten the global address (IP address) of the point A.

In step S103, the CPU 121 controls the communication unit 129 to transmit via the IM server 21 notification of the global address of the client 11 acquired in step S102 to a client (the client 12 in this specific example) with which the client 11 is going to communicate). Thus, the client 12 can get the global address of the client 11.

In step S104, the CPU 121 requests, via the IM server 21, the client (the client 12 in this specific example), with which the client 11 is going to perform communication on the global address basis, to notify of its global address. In response to the request, the client 12 transmits notification of the global address of the client 12 to the client 11 via the IM server 21 (step S123 described later with reference to FIG. 14). In step S105, the CPU 121 receives via the IM server 21 the notification of the global address from the client (the client 12 in this specific example) with which the client 11 is going to communicate on the global address basis. Thus, the CPU 121 has gotten the IP address serving as the global address of the point B of the client 12.

In step S106, the CPU 121 establishes a session for global address-based communication with the client 12 via the Internet 1 and performs peer-to-peer communication without passing through the IM server 21.

Figure 13:
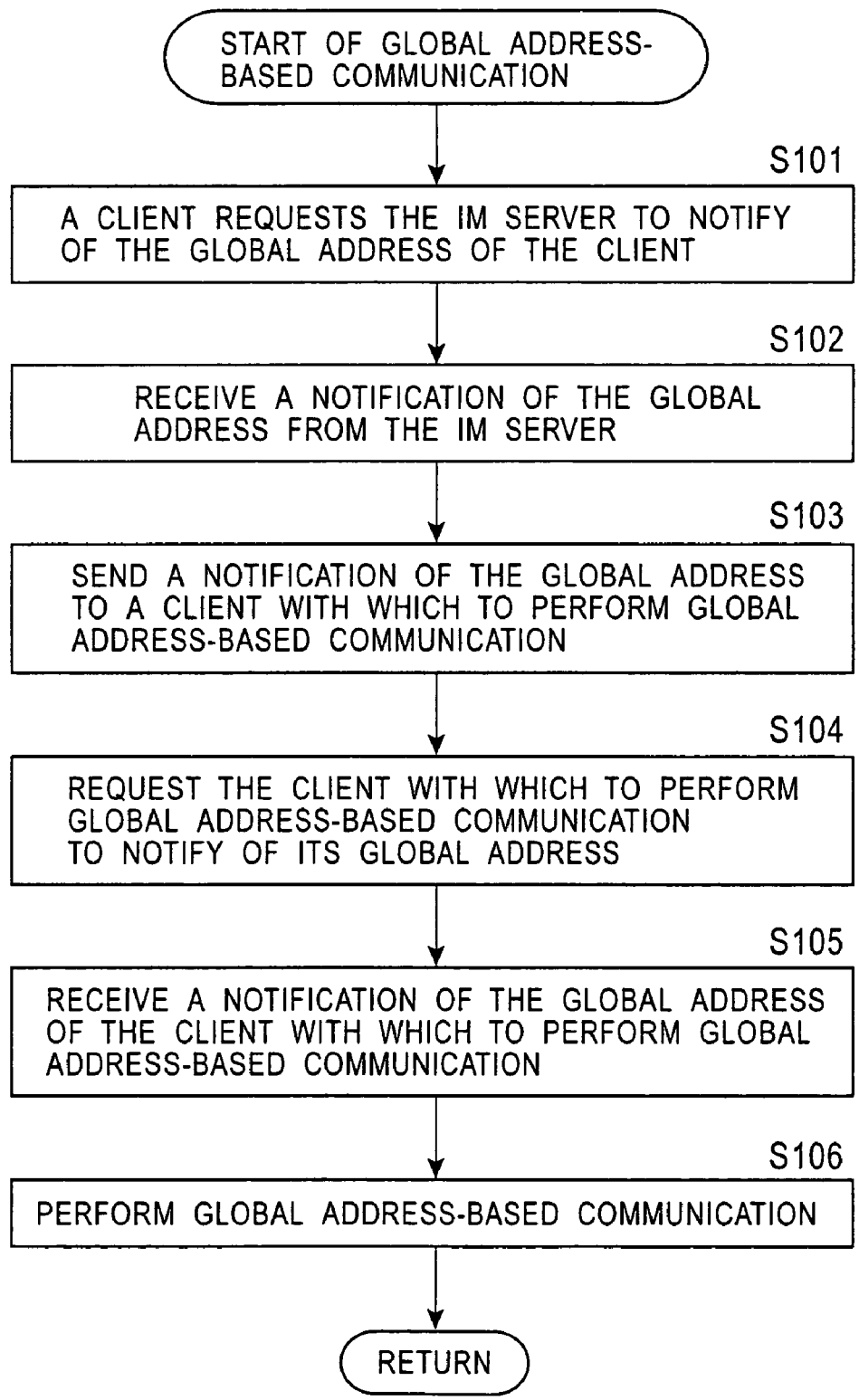
FIG. 13 is a flow chart showing the details of a global address-based communication in step S8 shown in FIG. 9.
Figure 14:
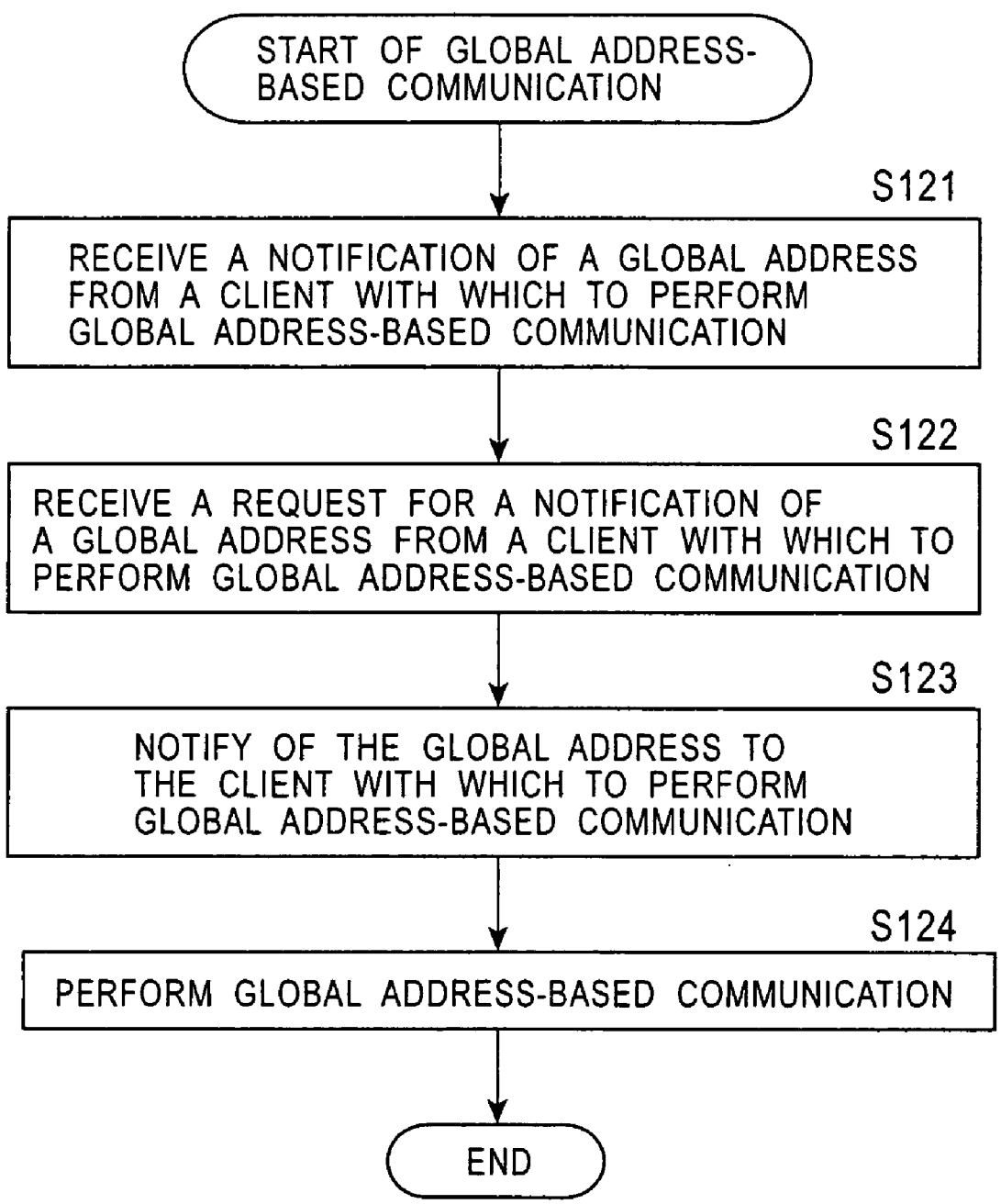
FIG. 14 is a flow chart showing a process of global address-based communication performed by another client in response to the process of global address-based communication shown in FIG. 13.

When the above process shown in FIG. 13 is performed by the client 11, a process shown in the form of a flow chart in FIG. 14 is performed by the client 12.

In step S121, the CPU 221 of the client 12 receives via the IM server 21 the notification of the global address from a client (the client 11 in this specific example) with which global address-based communication is going to be performed. This global address has been transmitted from the client 11 via the IM server 21 in step S103 shown in FIG. 13.

In step S122, the CPU 221 receives via the IM server 21 a request for notification of the global address from the client (the client 11 in this specific example) with which global address-based communication is going to be performed. This request has been issued in step S104 in FIG. 13. In step S123, in response to the request received in step S122, the CPU 221 transmits via the IM server 21 notification of the global address (the IP address of the point B) of the client 12 to the client (the client 11 in this specific example) with which global address-based communication is going to be performed. Thus, both the client 11 and the client 12 have gotten the IP addresses thereof. In step S124, the CPU 221 establishes a session on the basis of the global addresses and performs peer-to-peer communication via the Internet 1 without passing through the IM server 21.

In the case in which the communication is performed in a one-way fashion, steps S104 and S105 and steps S122 and S123 are skipped as in the case in which local address-based communication is performed in a one-way fashion. In the case of two-way communication, the response to the request for the address issued by the client 11 may be transmitted from the client 12 to the client 11 by means of peer-to-peer communication without passing through the IM server 21. The process in step S104 may be substantially incorporated into step S103 such that in step S103, when the client 12 receives the notification of the global address of the client 11, the client 12 transmits notification of the global address of the client 12 to the client 11 via the IM server 21 or by means of peer-to-peer communication.

Figure 15:
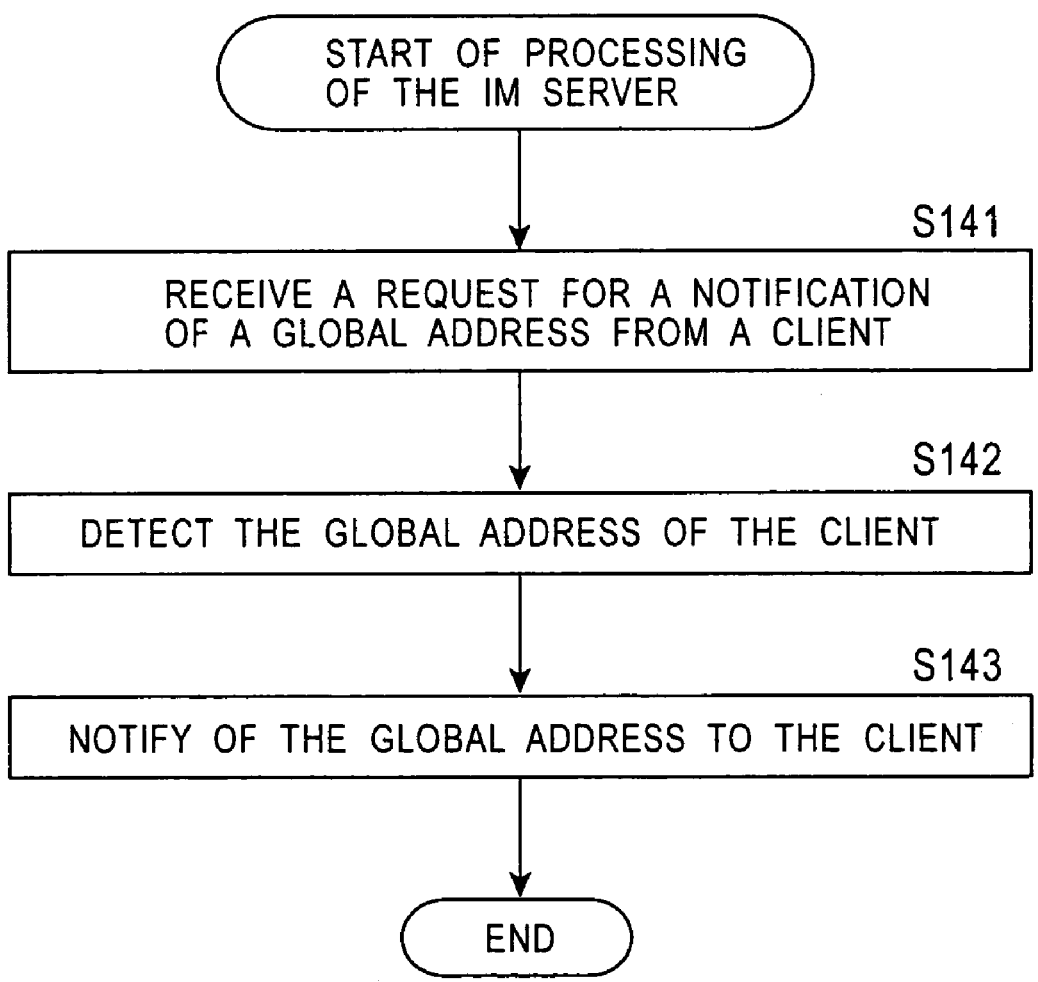
FIG. 15 is a flow chart showing a process performed by the IM server in response to the process of the global address-based communication performed by the client, shown in FIG. 13.

When the process of the global address-based communication shown in FIG. 13 is performed by the client 11, a process shown in the form of a flow chart in FIG. 15 is performed by the IM server 21.

In step S141, the CPU 321 receives via the communication unit 329 a request for notification of the global address from the client 11. This request has been issued in step S101 in FIG. 13. In step S142, in response to the request received in step S141, the CPU 321 examines the global address (the registered IP address) of the client 11. Note that the address is stored in the storage unit 328. In step S143, the CPU 321 transmits notification of the global address examined in step S142 to the client 11.

In a case in which the IM server 21 has the capability of STUN (Simple Traversal of UPD (User Datagram Protocol) though NAT), global addresses may be notified to clients using this capability.

In this case, when a request for notification of the global address is received from the client 11, the CPU 321 describes, in a data part of a response packet, the source address of the packet received from the client 11 and transmits the response packet.

More specifically, the NAT apparatus 41 describes the IP address (global address) of the point A plus the port number of the client 11 as the source address of a global address request packet issued by the client 11 to the IM server 21. When the IM server 21 receives this global address request packet, the IM server 21 produces a response packet such that the IP address (global address) of the point A and the port number of the client 11 are described in the data part of the response packet.

In the response packet, the IP address (global address) of the IM server 21 is described as the source address of the response packet, and the combination of the IP address of the point A of the NAT apparatus 41 and the port number is described as the destination address.

If the NAT apparatus 41 receives the response packet from the IM server 21, the NAT apparatus 41 confirms that the destination address of the response packet is identical to the IP address (global address) of the point A of the IM server 21. The NAT apparatus 41 capture the response packet and rewrites the source address of the response packet with the local address of the NAT apparatus 41 defined on the LAN 31 and rewrites the destination address with the local address of the client 11 defined on the LAN 31. The NAT apparatus 41 transmits the resultant response packet to the client 11. From the data part of the response packet, the client 11 can know the IP address (global address) of the point A of the NAT apparatus 41.

Figure 16:
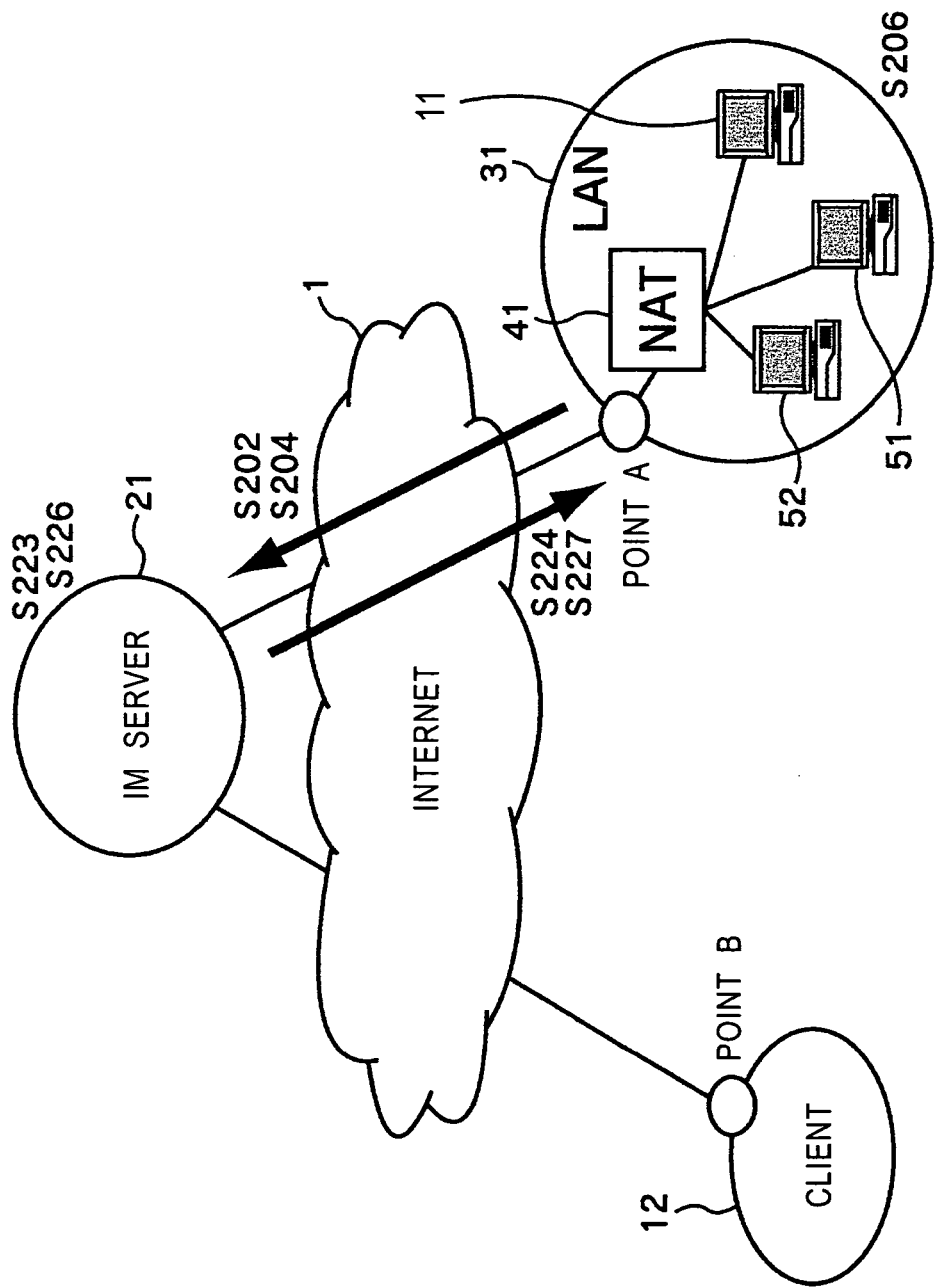
FIG. 16 is a diagram showing another example of a configuration of an information processing system.

In the embodiment described above, the IM server 21 determines whether the registered address of the client 11 and the registered address of the client 12 are identical to each other. Alternatively, as shown in FIG. 16, the client 11 may request the IM server 21 to provide notification of the IP address of the client 12, and client 11 may determines whether the registered address of the client 11 and the registered address of the client 12 are identical to each other, by comparing the IP address of the client 11 with the IP address of the client 12 notified by the IM server 21.

Figure 17:
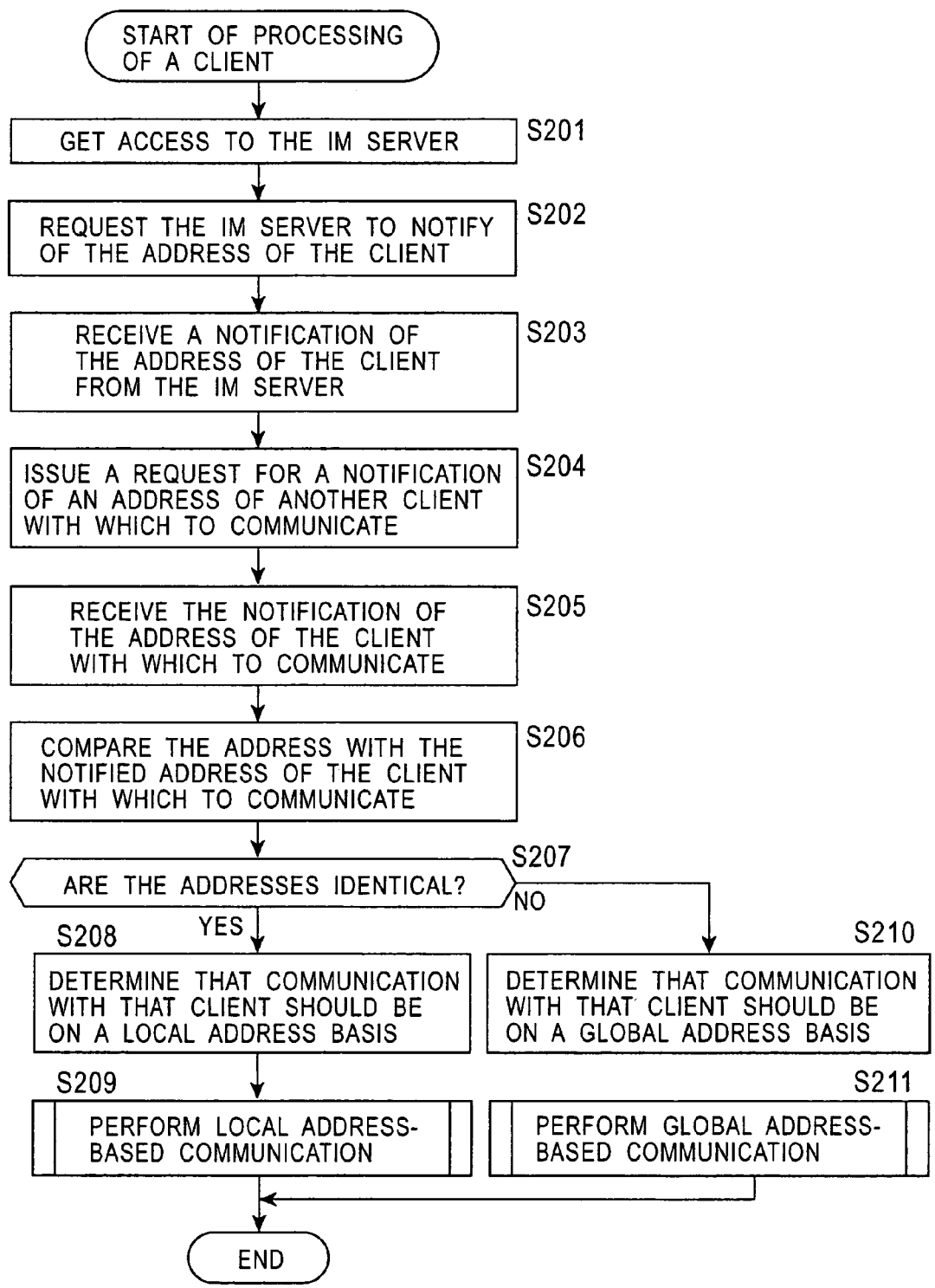
FIG. 17 is a flow chart showing a process performed by a client shown in FIG. 16.

The process performed by the client 11 in this case is described in further detail below with reference to a flow chart shown in FIG. 17.

In step S201, the CPU 121 of the client 11 gets access to the IM server 21. In step S202, the CPU 121 requests the IM server 21 to provide notification of the IP address (global address) of the client 11. In response to the request, the IM server 21 notifies the client 11 of the IP address of the client 11 (the IP address (global address) of the NAT apparatus 41) (in step S224 described later with reference to FIG. 18). In step S203, the CPU 121 receives the notification of the global address of the client 11 transmitted from the IM server 21.

In step S204, the CPU 121 issues a request for notification of the registered address of a client (the client 12 in this specific example) with which communication is going to be performed. In response to the request, the IM server 21 notifies of the registered address of the client 12 (in step S227 described later with reference to FIG. 18). In step S205, the CPU 121 receives the notification of the registered address of the client (the client 12 in this specific example).

In steps S206, the CPU 121 compares the IP address (global address) of the client 11 acquired in step S203 with the registered address (IP address), acquired in step S205, of the client (the client 12 in this specific example) with which communication is going to be performed. In step S207, the CPU 121 determines whether the addresses are identical to each other, on the basis of the result of the comparison. If the addresses are identical to each other, it is determined in step S208 that the communication should be performed on the local address basis. In this case, the process proceeds to step S209 to perform local address-based communication.

On the other hand, in the case in which it is determined in step S207 that the addresses are not identical to each other, the process proceeds to step S210. In step S210, the CPU 121 determines that communication with the above-described client should be performed on the global address basis. In step S211, global address-based communication is performed.

Steps S207 to S211 are performed in a similar manner to steps S4 to S8 shown in FIG. 9.

Figure 18:
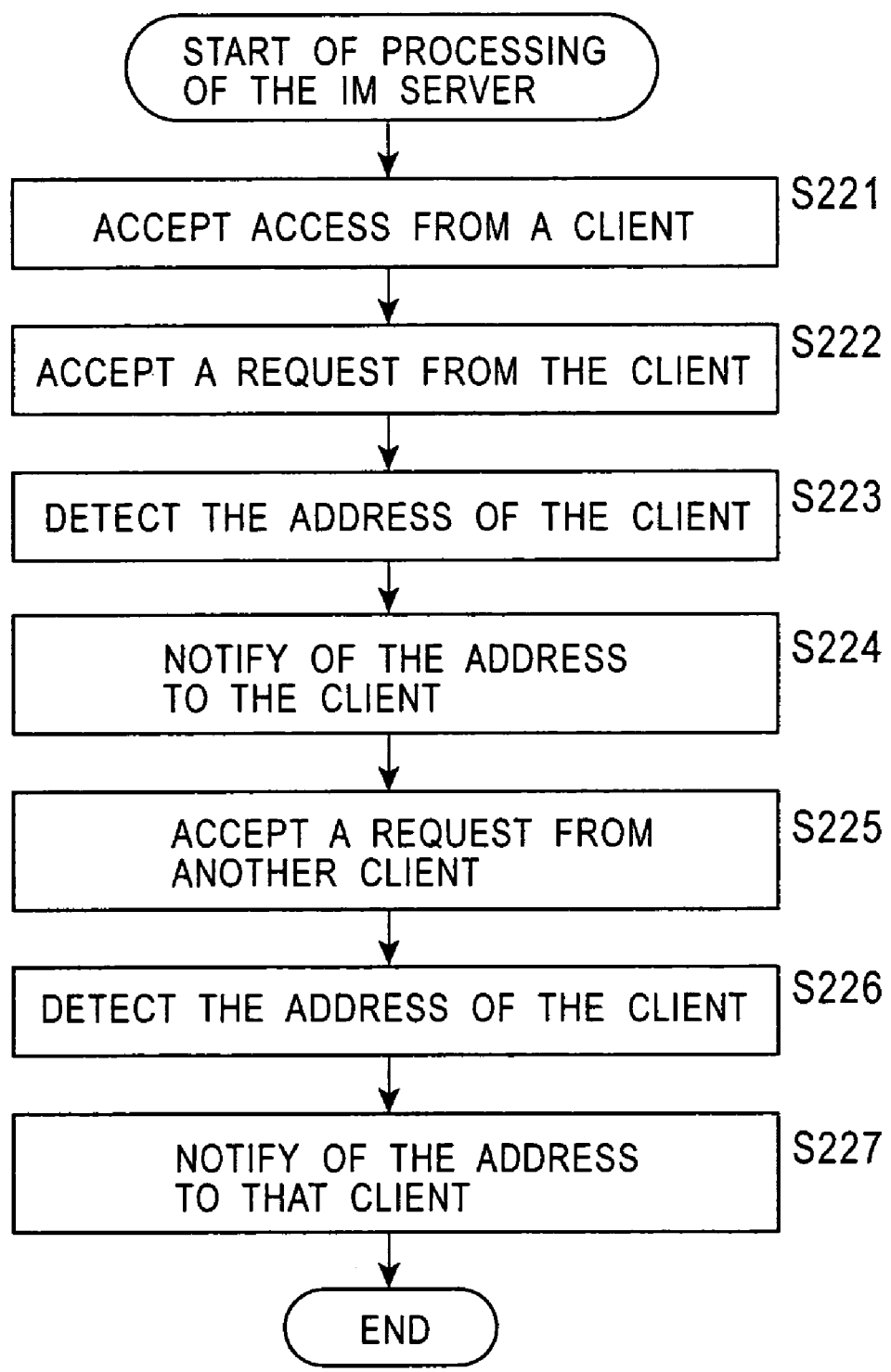
FIG. 18 is a flow chart showing a process performed by a IM server shown in FIG. 16.

When the above-described process is performed by the client 11, the IM server 21 performs a process shown in the form of a flow chart in FIG. 18.

In step S221, the CPU 321 of the IM server 21 accepts an access from the client 11. In step S222, the CPU 321 accepts a request issued by the client 11. Note that this request for notification of the IP address (global address) of the client 11 has been issued in step S202 shown in FIG. 17. In step S223, the CPU 321 examines the storage unit 328 to detect the registered address of the client 11. In step S224, the registered address (IP address) of the client 11 detected via the examination is notified to the client 11.

Steps S222 to S224 described above are performed in a similar manner to steps S141 to S143 shown in FIG. 15 and may be performed using the STUN capability of the IM server 21.

In step S225, the CPU 321 accepts a request from the client 11. Note that this request for notification of the address of a client (the client 12 in this specific example) has been issued in step S204 shown in FIG. 17. In step S226, the CPU 321 examines the storage unit 328 to detect the registered address of the client (the client 12 in this specific example). In step S227, the address detected in the examination is notified to the client 11.

As described above with reference to FIGS. 16 to 18, the client 11 may performs the determination by comparing the IP address of the client 11 with the IP address of the client 12. However, in this case, it becomes necessary to transmit the IP address of the client 12, which must be kept secret, via the Internet 1. This is undesirable compared with the case in which the determination is performed by the IM server 21 and only the result of the determination is notified to the client 11 as described earlier with reference to FIG. 5. Besides, the transmission of the IP address via the Internet 1 results in an increase in traffic. Thus, it is more desirable to transmit only the result of the determination from the IM server 21 to the client 11.

The NAT apparatus 41 described above may be provided in the form a dedicated apparatus or may be incorporated in another apparatus such as a firewall apparatus. As for a device used as each client, not only a personal computer but also other devices such as a portable telephone or a PDA may be employed.

The processing sequence described above may be executed by hardware or software. When the processing sequence is executed by software, a program forming the software may be installed from a storage medium or via a network onto a computer which is provided as dedicated hardware or may be installed onto a general-purpose computer capable of performing various processes in accordance with various programs installed thereon.

A specific example of a storage medium usable for the above purpose is, as shown in FIGS. 6 to 8, a removable medium 131, 231, or 331 such as a magnetic disk (for example, as a floppy disk), an optical disk (for example, a CD-ROM (Compact Disk-Read Only Memory) and a DVD (Digital Versatile Disk)), a magnetooptical disk (for example, a MD (Mini-Disc) (registered trademark)), or a semiconductor memory, in the form of a package medium including a program stored thereon which is supplied to a user separately from a computer. The program may also be supplied to a user together with a computer including a built-in ROM 122, 222 or 322 or a hard disk in the storage unit 128, 228 or 328 in which the program has been preinstalled.

In the present description, the steps described in the program stored in the storage medium may be performed either in time sequence in accordance with the order described in the program or in a parallel or separate fashion. In the present description, the term "system" is used to represent an entire set of apparatuses.

What is claimed is:

1. An information processing system comprising:
    a first information processing apparatus connected with a first network and also connected with a second network via an address translator for addresses translation;
    a second information processing apparatus configured to perform communication with the first information processing apparatus; and
    a third information processing apparatus connected with the second network, for managing communication between the first information processing apparatus and the second information processing apparatus, wherein
    the first information processing apparatus requests the third information processing apparatus to provide information associated with connection of the second information processing apparatus;
    the third information processing apparatus provides an information associated with the connection of the second information processing apparatus to the first information processing apparatus;
    the first information processing apparatus determines, on the basis of the information provided by the third information processing apparatus, whether the second information processing apparatus is connected with a same network as that with which the first information processing apparatus is connected; and
    the first information processing apparatus performs communication with the second information processing apparatus such that if the second information processing apparatus is determined to be connected with the same network as that with which the first information processing apparatus is connected, communication with the second information processing apparatus is performed on the basis of a network-specific address defined on the first network, while if the second information processing apparatus is determined not to be connected with the same network as that with which the first information processing apparatus is connected, communication with the second information processing apparatus is performed on the basis of a different address than the network-specific address, said different address being a global address that is recognized on the second network.

2. An information processing system according to claim 1, wherein
    the first information processing apparatus requests the third information processing apparatus to provide, as the information associated with the connection of the second information processing apparatus to the first information processing apparatus, the global address, defined on the second network, of the second information processing apparatus;
    the third information processing apparatus provides, as the information associated with the connection of the second information processing apparatus to the first information processing apparatus, the global address, defined on the second network, of the second information processing apparatus; and
    the first information processing apparatus determines, on the basis of the global address, defined on the second network, of the second information processing apparatus, whether the second information processing apparatus is connected with the same network as that with which the first information processing apparatus is connected.

3. An information processing system according to claim 1, wherein
    the first information processing apparatus requests, as the information associated with the connection, information indicating whether the second information processing apparatus and the first information processing apparatus are connected with the same network;
    the third information processing apparatus examines whether the second information processing apparatus and the first information processing apparatus are connected with the same network and the third information processing apparatus provides a result of the examination as the information associated with the connection; and
    the first information processing apparatus determines, on the basis of a received information indicating the result of the examination performed by the third information processing apparatus, whether the second information processing apparatus is connected with the same network as that with which the first information processing apparatus is connected.

4. An information processing system according to claim 3, wherein the third information processing apparatus examines whether the first information processing apparatus and the second information processing apparatus are connected with the same network, on the basis of addresses defined on the second network, of the first information processing apparatus and the second information processing apparatus.

5. An information processing system according to claim 3, wherein the third information processing apparatus examines whether the second information processing apparatus and the first information processing apparatus are connected with the same address translator to examine whether the second information processing apparatus and the first information processing apparatus are connected with the same network.

6. An information processing system according to claim 5, wherein the third information processing apparatus examines whether the second information processing apparatus and the first information processing apparatus have the same global address defined on the second network to examine whether the second information processing apparatus and the first information processing apparatus are connected with the same network.

7. An information processing method for an information processing system including a first information processing apparatus connected with a first network and also connected with a second network via an address translator for addresses translation, a second information processing apparatus that performs communication with the first information processing apparatus, and, a third information processing apparatus connected with the second network, for managing communication between the first information processing apparatus and the second information processing apparatus, wherein the first information processing apparatus requests the third information processing apparatus to provide information associated with connection of the second information processing apparatus;

the third information processing apparatus provides an information associated with the connection of the second information processing apparatus to the first information processing apparatus;

the first information processing apparatus determines, on the basis of the information provided by the third information processing apparatus, whether the second information processing apparatus is connected with a same network as that with which the first information processing apparatus is connected; and the first information processing apparatus performs communication with the second information processing apparatus such that if the second information processing apparatus is determined to be connected with the same network as that with which the first information processing apparatus is connected, communication with the second information processing apparatus is performed on the basis of a network-specific address defined on the first network, while if the second information processing apparatus is determined not to be connected with the same network as that with which the first information processing apparatus is connected, communication with the second information processing apparatus is performed on the basis of a different address than the network-specific address, said different address being a global address that is recognized on the second network.

8. An information processing apparatus that performs communication with another information processing apparatus, the information processing apparatus being connected with a first network and also connected, via an address translator for addresses translation, with a second network with which a server is connected, the information processing apparatus comprising request means for requesting the server to provide information associated with connection of said another information processing apparatus;

reception means for receiving information associated with the connection of said another information processing apparatus from the server; and communication means for performing communication with said another information processing apparatus such that the communication means determines, on the basis of the information received from the server, whether said another information processing apparatus is connected with a same network as that with which the information processing apparatus is connected, and if it is determined that said another information processing apparatus is connected with the same network as that with which the information processing apparatus is connected, the communication means performs communication with said another information processing apparatus on the basis of a network-specific address defined on the first network, while if it is determined that said another information processing apparatus is not connected with the same network as that with which the information processing apparatus is connected, the communication means performs communication with said another information processing apparatus on the basis of a different address than the network-specific address, said different address being a global address that is recognized on the second network.

9. An information processing apparatus according to claim 8, wherein the request means requests, as the information associated with connection of the second information processing apparatus to the first information processing apparatus, the global address, defined on the second network, of said another information processing apparatus; and the communication means determines, on the basis of the global address, defined on the second network, of said another information processing apparatus, whether said another information processing apparatus is connected with the same network as that with which the information processing apparatus is connected.

10. An information processing apparatus according to claim 8, wherein the request means requests, as the information associated with the connection, information indicating whether said another information processing apparatus and the information processing apparatus are connected with the same network; and the communication means determines, on the basis of the information supplied from the server, whether said another information processing apparatus is connected with the same network as that with which the information processing apparatus is connected.

11. An information processing apparatus according to claim 10, wherein the request means requests, as the information indicating whether said another information processing apparatus and the information processing apparatus are connected with the same network, information indicating whether said another information processing apparatus and the information processing apparatus are connected with the same address translator.

12. An information processing apparatus according to claim 11, wherein the request means requests, as the information indicating whether said another information processing apparatus and the information processing apparatus are connected with the same address translator, information indicating whether said another information processing apparatus and the information processing apparatus have the same address.

13. An information processing apparatus according to claim 8, wherein the first network is a LAN;

the second network is the Internet;

the network-specific address on the first network is a local address; and the different address on the second network is a global address.

14. An information processing apparatus according to claim 8, wherein if the information received from the server indicates that said another information processing apparatus is not connected with the same network as that with which the information processing apparatus is connected, the request means further requests the server to provide the different address, defined on the second network, of the information processing apparatus.

15. An information processing apparatus according to claim 8, wherein if it is determined that said another information processing apparatus is not connected with the same network as that with which the information processing apparatus is connected, the communication means transmits the different address, defined on the second network, of the information processing apparatus to said another information processing apparatus via the server and receives the different address, defined on the second network, of said another information processing apparatus via the server.

16. An information processing apparatus according to claim 8, wherein if it is determined that said another information processing apparatus is connected with the same network as that with which the information processing apparatus is connected, the communication means transmits the network-specific address, defined on the first network, of the information processing apparatus to said another information processing apparatus via the server and receives the network-specific address, defined on the first network, of said another information processing apparatus via the server.

17. An information processing method for an information processing apparatus that performs communication with another information processing apparatus, the information processing apparatus being connected with a first network and also connected, via an address translator for addresses translation, with a second network with which a server is connected, the information processing method comprising the steps of:
  requesting the server to provide information associated with connection of said another information processing apparatus;
  receiving information associated with the connection of said another information processing apparatus from the server; and
  performing communication with said another information processing apparatus in such a manner that determination as to whether said another information processing apparatus is connected with the same network as that with which the information processing apparatus is connected is made on the basis of the information received from the server, and if it is determined that said another information processing apparatus is connected with the same network as that with which the information processing apparatus is connected, communication with said another information processing apparatus is performed on the basis of a network-specific address defined on the first network, while if it is determined that said another information processing apparatus is not connected with the same network as that with which the information processing apparatus is connected, communication with said another information processing apparatus is performed on the basis of a different address than the network-specific address, said different address being a global address that is recognized on the second network.

18. A computer program product having computer readable instructions for causing a computer to perform processing associated with an information processing apparatus that performs communication with another information processing apparatus, the information processing apparatus being connected with a first network and also connected, via an address translator for addresses translation, with a second network with which a server is connected, the processing comprising the steps of:
  requesting the server to provide information associated with connection of said another information processing apparatus;
  receiving information associated with the connection of said another information processing apparatus from the server; and
  performing communication with said another information processing apparatus in such a manner that determination as to whether said another information processing apparatus is connected with the same network as that with which the information processing apparatus is connected is made on the basis of the information received from the server, and if it is determined that said another information processing apparatus is connected with the same network as that with which the information processing apparatus is connected, communication with said another information processing apparatus is performed on the basis of a network-specific address defined on the first network, while if it is determined that said another information processing apparatus is not connected with the same network as that with which the information processing apparatus is connected, communication with said another information processing apparatus is performed on the basis of a different address than the network-specific address, said different address being a global address that is recognized on the second network.

19. An information processing apparatus connected with a first network and a second network, for managing communication between a first apparatus and a second apparatus, the first apparatus being connected with the second network via an address translator for address translation, the information processing apparatus comprising:
  reception means for receiving, from the first apparatus, a request for determination as to whether the second apparatus is connected with the same network as that with which the first apparatus is connected;
  examination means for examining whether the second apparatus is connected with the same network as that with which the first apparatus is connected; and
  informing means for informing the first apparatus of the result of the examination performed by the examination means.

20. An information processing apparatus according to claim 19, wherein the examination means examines whether the first apparatus and the second apparatus are connected with the same address translator to examine whether the second apparatus is connected with the same network as that with which the first apparatus is connected.

21. An information processing apparatus according to claim 20, wherein the examination means examines whether the first apparatus and the second apparatus have a same address to examine whether the fist apparatus and the second apparatus are connected with the same address translator.

22. An information processing apparatus according to claim 19, wherein
  the first network is a LAN;
  the second network is the Internet;
  an address on the first network is a local address; and
  an address on the second network is a global address.

23. An information processing apparatus according to claim 19, wherein the informing means transmits 1-bit data indicating the result of the examination performed by the examination means to the first apparatus.

24. An information processing method, in an information processing apparatus connected with a first network and a second network, for managing communication between a first apparatus and a second apparatus, the first apparatus being connected with the second network via an address translator for address transformation, the information processing method comprising the steps of:

receiving, from the first apparatus, a request for determination as to whether the second apparatus is connected with the same network as that with which the first apparatus is connected;

examining whether the second apparatus is connected with the same network as that with which the first apparatus is connected; and, informing the first apparatus of the result of the examination performed in the examination step.

25. A computer program product having computer readable instructions for causing a computer to perform processing associated with an information processing apparatus connected with a first network and a second network, for managing communication between a first apparatus and a second apparatus, the first apparatus being connected with the second network via an address translator for address transformation, the processing comprising the steps of:

receiving, from the first apparatus, a request for determination as to whether the second apparatus is connected with the same network as that with which the first apparatus is connected;

examining whether the second apparatus is connected with the same network as that with which the first apparatus is connected; and, informing the first apparatus of the result of the examination performed in the examination step.

* * * * *